United States Patent
Dey et al.

(10) Patent No.: US 8,519,351 B2
(45) Date of Patent: Aug. 27, 2013

(54) SPECT CAMERA

(75) Inventors: Joyoni Dey, Somerville, MA (US); Stephen J. Glick, Holden, MA (US)

(73) Assignee: University of Massachusetts, Boston, MA (US)

( * ) Notice: Subject to any disclaimer, the term of this patent is extended or adjusted under 35 U.S.C. 154(b) by 393 days.

(21) Appl. No.: 12/769,211

(22) Filed: Apr. 28, 2010

(65) Prior Publication Data
US 2010/0282977 A1  Nov. 11, 2010

Related U.S. Application Data

(60) Provisional application No. 61/175,587, filed on May 5, 2009.

(51) Int. Cl.
*G01J 1/42* (2006.01)
*G01T 1/00* (2006.01)
*G01T 1/24* (2006.01)
*G01T 1/20* (2006.01)
*G01T 1/161* (2006.01)

(52) U.S. Cl.
USPC ... 250/394; 250/395; 250/363.1; 250/363.02; 250/363.08; 250/393; 250/370.09

(58) Field of Classification Search
USPC .............. 250/394–395, 363.1, 363.02, 393, 250/363.08, 370.09
See application file for complete search history.

(56) References Cited

U.S. PATENT DOCUMENTS

| | | | | |
|---|---|---|---|---|
| 6,103,147 A | * | 8/2000 | Rybicki | 264/1.21 |
| 6,160,259 A | * | 12/2000 | Petrillo et al. | 250/363.07 |
| 7,989,771 B2 | * | 8/2011 | Wieczorek et al. | 250/363.1 |

* cited by examiner

*Primary Examiner* — Michael G Lee
*Assistant Examiner* — Laura Gudorf
(74) *Attorney, Agent, or Firm* — Milstein Zhang & Wu LLC; Joseph B. Milstein

(57) ABSTRACT

Systems and methods for providing improved detectors for use in SPECT cameras. The improved detectors use pinhole apertures and surfaces calculated to provide improved sensitivity and resolution. In some embodiments, the detectors have non-planar surfaces. In some embodiments, the surfaces are spherical, conical, parabolic, or other non-planar forms.

11 Claims, 17 Drawing Sheets

FIG. 6A
FIG. 6B
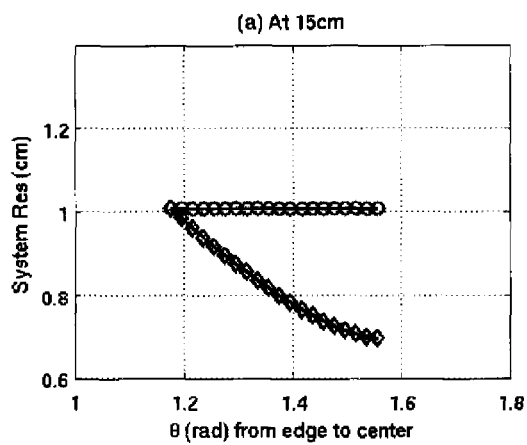
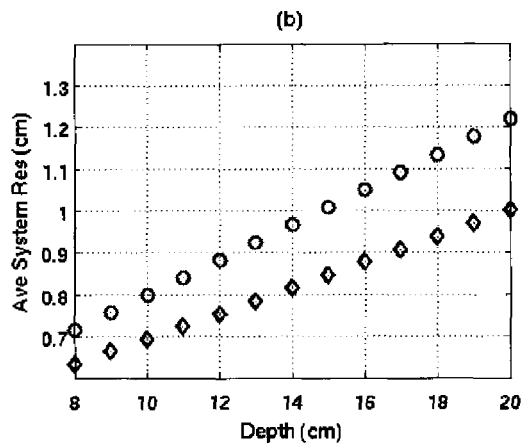
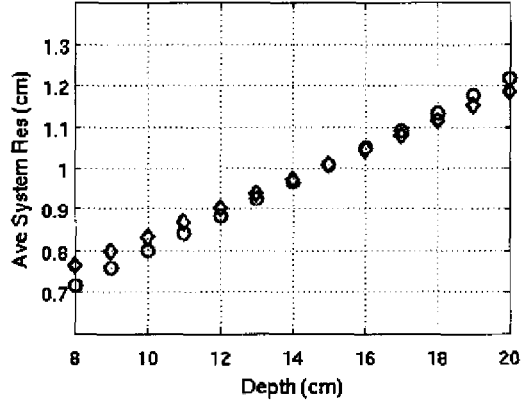
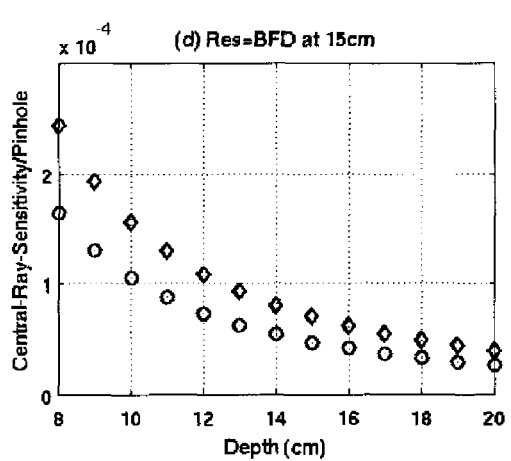
FIG. 6C
FIG. 6D

FIG. 7A
FIG. 7B
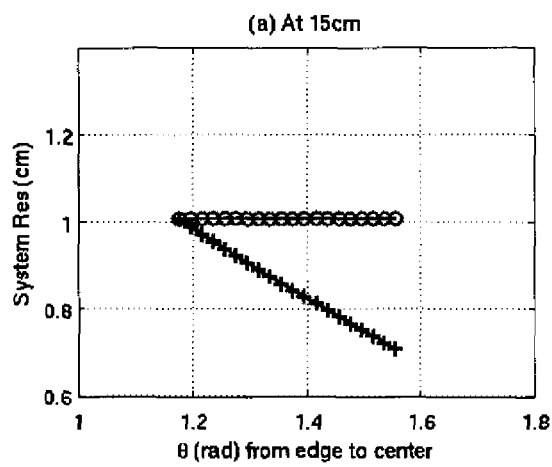
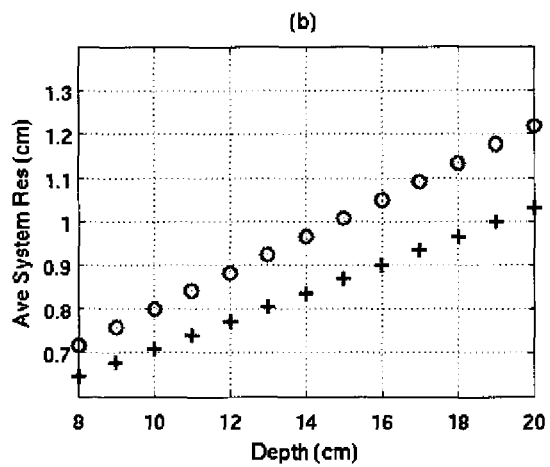
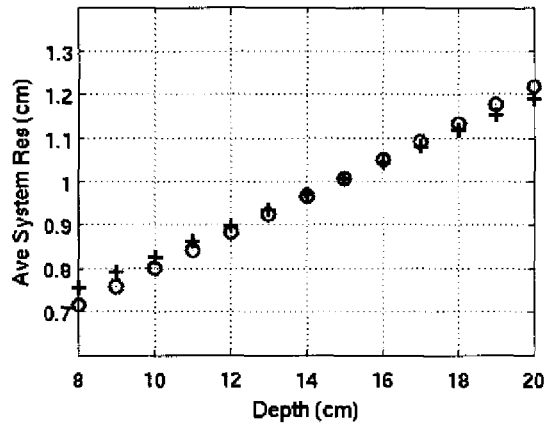
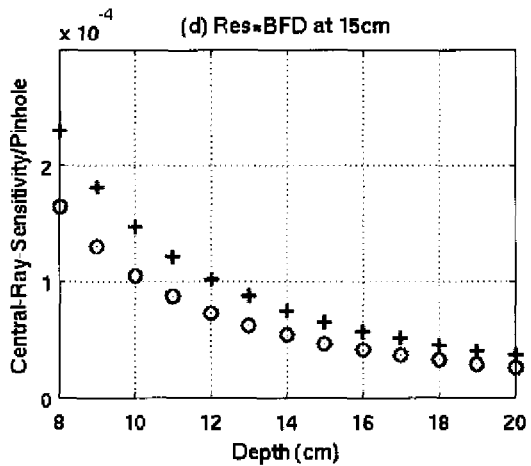
FIG. 7C
FIG. 7D

FIG.15A
FIG.15B
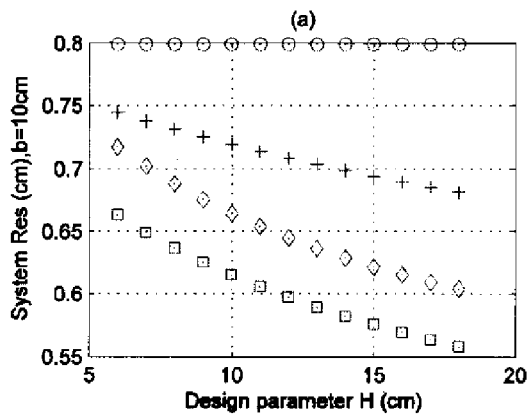
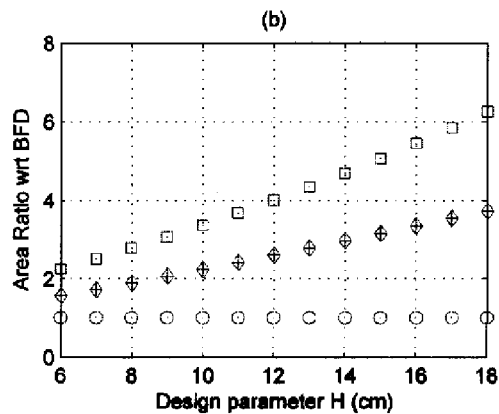
FIG. 15C
FIG. 15D
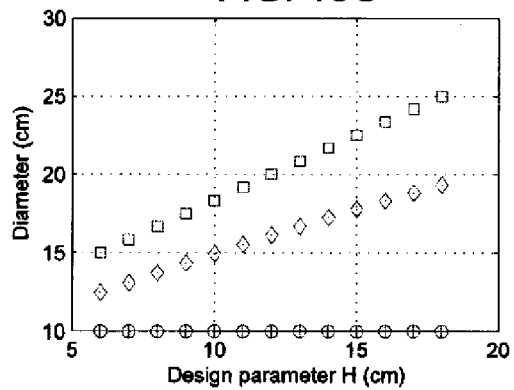
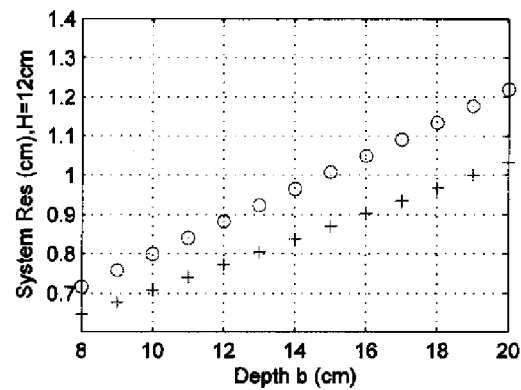
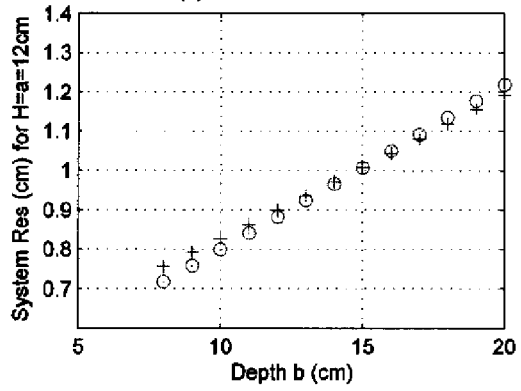
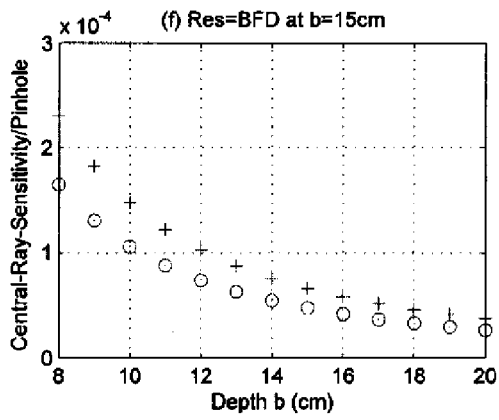
FIG.15E
FIG.15F FIG.16A
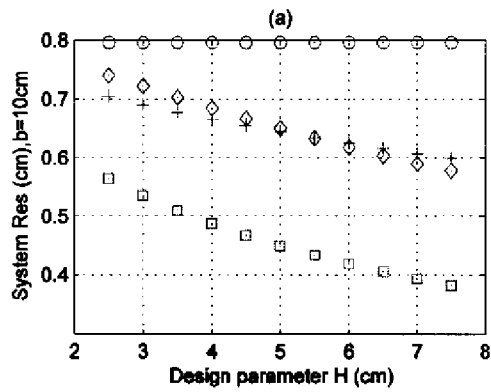
FIG.16B
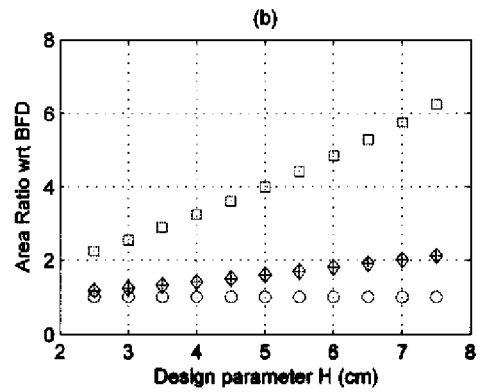
FIG. 16C
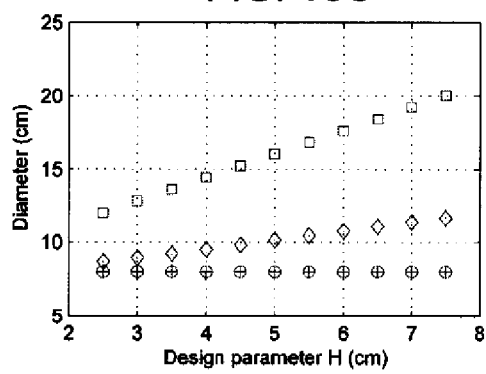
FIG. 16D
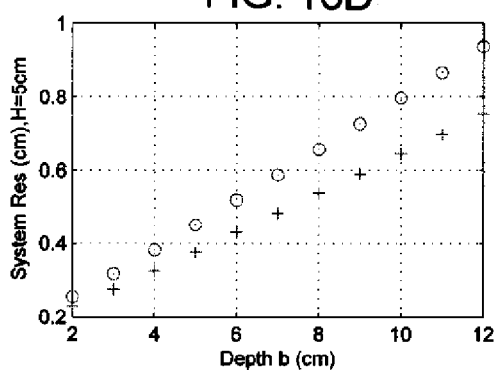
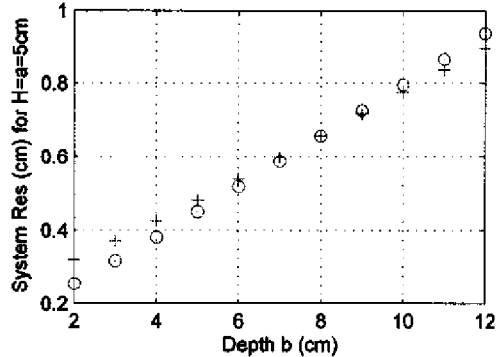
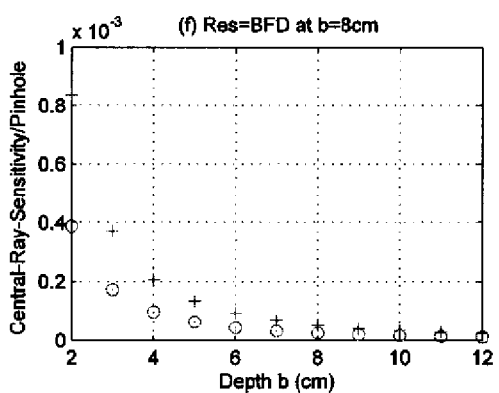
FIG.16E
FIG.16F FIG.17A
FIG.17B
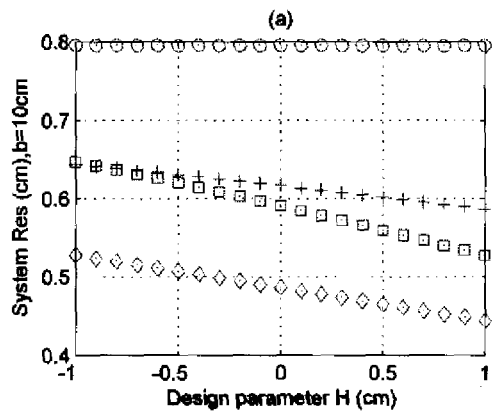
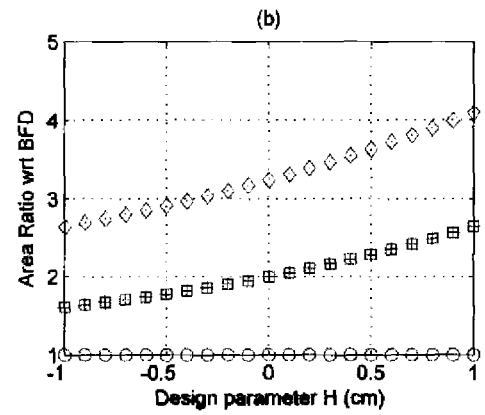
FIG. 17C
FIG. 17D
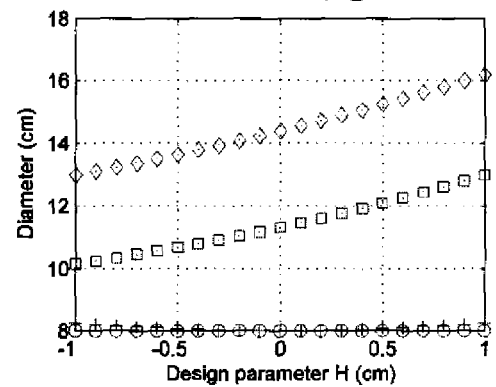
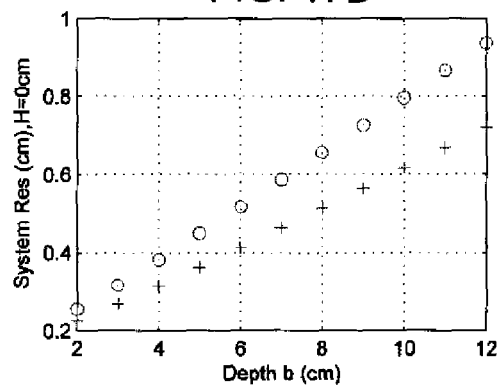
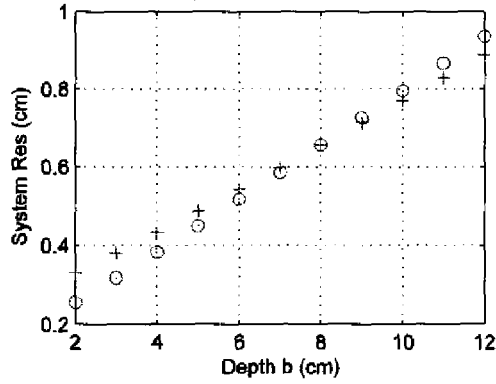
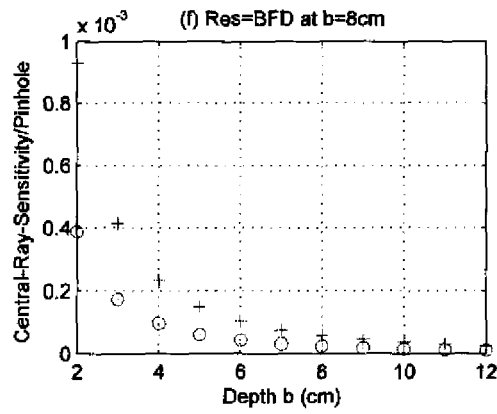
FIG.17E
FIG.17F

FIG.18A
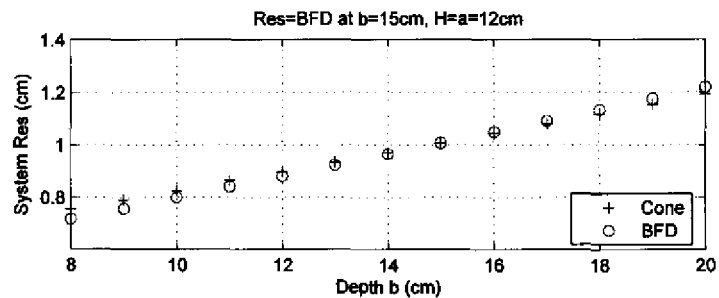
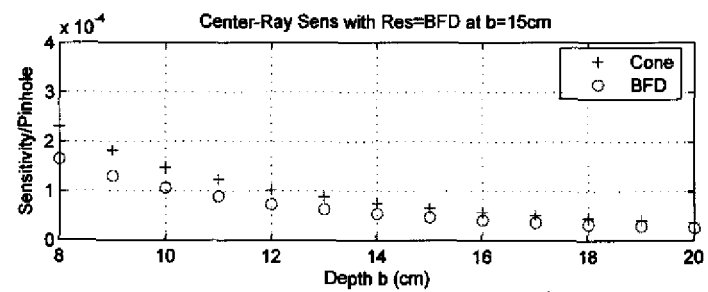
FIG.18B
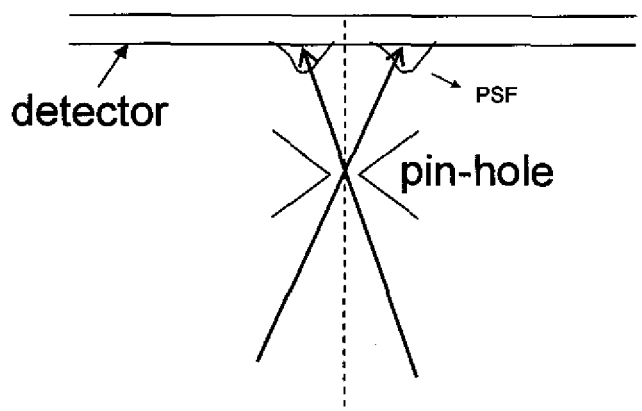
FIG. 19

FIG. 25

Table 1: Flat Detector: FWHM of PSF (b=150mm)

All in mm

| mm | Pinhole Dia 4.11mm | | Pinhole Dia 12mm | |
|---|---|---|---|---|
| | Meas | Ideal | Meas | Ideal |
| a = 120 | 9.34 | 9.25 | 28.02 | 27 |
| a = 80 | 11.68 | 11.82 | 35.03 | 34.5 |

FIG. 26

Table 2: Curved Detector: FWHM of PSF (b=150mm)

(a=120mm)    All in mm

| Dia | FWHM (mm) Radially from center to edge (in steps of 9 mm) | | | | | | Mean |
|---|---|---|---|---|---|---|---|
| 4.11 | 7.05 | 8.1 | 8.4 | 8.4 | 9.3 | 9.5 | (8.46) |
| 5.0 | 9.3 | 9.6 | 10.5 | 10.5 | 11.5 | 11.7 | (10.52) |

SPECT CAMERA

CROSS-REFERENCE TO RELATED APPLICATIONS

This application claims priority to and the benefit of U.S. provisional patent application Ser. No. 61/175,587, filed May 5, 2009, which application is incorporated herein by reference in its entirety.

STATEMENT REGARDING FEDERALLY FUNDED RESEARCH OR DEVELOPMENT

None.

THE NAMES OF THE PARTIES TO A JOINT RESEARCH AGREEMENT

NOT APPLICABLE

INCORPORATION-BY-REFERENCE OF MATERIAL SUBMITTED ON A COMPACT DISC

NOT APPLICABLE

FIELD OF THE INVENTION

The invention relates to single positron emission computed tomography (SPECT) cameras in general and particularly to a SPECT camera that employs a non-planar detection surface.

BACKGROUND OF THE INVENTION

SPECT remains an important technique for assessing myocardial perfusion. However SPECT in general suffers from low sensitivity because of the necessity for collimation. New designs have emerged with 5-8 times the sensitivity of the standard gamma cameras currently used in the clinic for estimating myocardial perfusion. For an overview of the technologies see Slomka et al, "Advances in technical aspects of myocardial perfusion SPECT imaging", *J. Nucl Cardiol*, vol. 16, no. 2, pp 255-276, March/April 2009. Most of these designs choose a region of interest around the heart.

The DSPECT system available from Spectrum Dynamics Ltd., 4115 Blackhawk Plaza Circle, Suite 100, Danville, Calif. 94506 uses parallel-hole collimation. Erlandsson et al. ("Performance Evaluation of D-SPECT: a novel SPECT System of nuclear cardiology", *Phys. Med. Biol*, vol. 54, pp 2635-2649, 2009) and Gambhir et al. ("A novel High-Sensitivity Rapid-Acquisition Single-Photon Cardiac Imaging Camera", *J. Nucl. Med*, vol. 50, No 4, pp 635-643, April 2009) analyzed the DSPECT system which uses 9 flat CZT detectors with parallel-hole collimation arranged in a configuration to conform to the shape of the patient's chest. Each of the 9 detector blocks rotates around its central axis and are also translated to give a complete tomographic sampling. Higher sensitive, worse resolution collimators are used compared to the Low Energy High Resolution (LEHR) collimator used in a standard cardiac acquisition. Hence the geometric resolution was expected to be worse by more than a factor of 2. However, using collimator resolution compensation in iterative OSEM reconstruction the resolution degradation with respect to standard system was entirely compensated for. The planar sensitivity improvement compared to standard GE (Infinia) acquisition was 5.5 times and for tomographic reconstruction the improvement was 4.6-7.9 times for the heart region. The acquisition times reported by Gambhir for clinical studies were 5.5 times faster compared to standard system (2 min for DSPECT versus 11 mins for conventional). The CZT-based system can be used for dual-isotope molecular imaging.

Another system, CardiArc (available from CardiArc, 7444 Haggerty Road, Canton, Mich. 48187, www.cardiarc.com) uses a slit aperture moving over horizontal vanes (effectively achieving slit-slat collimation) over a curved-shaped detector. The CardiArc was designed with semiconductor CZT as well as crystal NaI detectors. Clinical images displayed on the CardiArc website pertain to the CZT design. The acquisition time reported by the company is 2 minutes. The resolution is 3.6 at 82 mm depth of source from aperture.

Pinhole collimation is used in UFC (Ultra Fast Cardiac SPECT Camera) from GE. This system is described in L. Volokh et al., "Myocardial Perfusion Imaging with an Ultrafast Cardiac SPECT Camera—a Phantom Study", in *Proc IEEE NSS-MIC*, Dresden, Germany, pp. 4636-4639, Oct. 19-25, 2008, I. Blevis et al., "CZT Gamma Camera with Pinhole Collimator: Spectral Measurements", in *Proc IEEE NSS-MIC*, Dresden, Germany, pp. 4931-4932, Oct. 19-25, 2008, and L. Volokh et al., "Effect of detector energy response on image quality of myocardial perfusion SPECT", in *Proc IEEE NSS-MIC*, Dresden, Germany, pp. 4043-4036, Oct. 19-25, 2008. The advantages of pinhole designs are that there are no moving parts, thus reducing manufacturing and servicing costs. The UFC system also uses CZT detectors. Initial UFC performance reports indicate rest and stress acquisition times of 5 and 3 minutes compared to 12.5 and 10 mins for GE Ventri Camera [2] for an anthropomorphic phantom.

Funk et al., "A Novel approach to Multipinhole SPECT for Myocardial Perfusion Imaging", *J. Nucl. Med*, vol. 47 pp 595-602, 2006, used a multi-pinhole system attached to a NaI crystal detector. Detailed measurements and simulations were done on point sources and anthropomorphic phantom. Their measurements were compared to parallel-collimation using LEGP (low energy general purpose collimators) and from those measurements it was predicted by simulation that the system would provide sensitivity improvement factor of 5 over the standard parallel-LEHR that is typically used for myocardial perfusion clinical studies for similar resolution. Further they did simulation studies with the NCAT phantom using a single-view, 2-view and 4-view of the 9-pinhole system and found that 4-views (with 36 pinholes) were adequate for artifact-free reconstruction.

The small-animal imaging literature is rich with fine-resolution and/or fast acquisition system designs. A SPECT/CT system is described by A. Stolin et al., "Dual-modality scanner for small animal imaging", in *Proc IEEE NSS-MIC*, vol. 4, Oct. 29-Nov. 1, 2006, pp. 2403-2407, 2006. For the SPECT part there are 4 rotating detector heads (with pinholes or parallel collimators) which can be operated in pairs to implement an unique half-cone geometry, reducing the acquisition time compared to a full-cone-beam geometry. Use of a multiplexed coded aperture system as described by R. G. Paxman et al. ("Two Algorithms for Use with an Orthogonal—View Coded-Aperture System", *J. Nucl. Med*, vol. 25, pp 1700-1705, 1984) with pinholes projecting into overlapping detector areas also result in more efficient coverage of detector space, leading to an increase in system sensitivity, as discussed in S. R. Meikle et al., "An Investigation of Coded Aperture imaging for Small Animal SPECT", *IEEE Trans. Nucl. Sci.*, vol. 48, no. 3, pp 816-821, June 2001 and N. U. Schramm et al., "High-Resolution SPECT Using Multipinhole Collimation", *IEEE Trans. Nucl. Sci.*, vol. 50, no 3., pp 315-320, 2003. However, the multiplexing can degrade the system matrix and can introduce problems in tomographic image reconstruction. F. J. Beekman and B. Vastenhouw, "Design and simulation of a high-resolution stationary SPECT system for small animals", *Phys. Med. Biol*, vol. 49, pp 4579-4592, 2004 describes a stationary configuration of pinholes focused on the small object. The performance of a triple-detector SPECT system with 2 pinholes per detector is described in R. E. Zimmerman et al., "Performance of a Triple-Dectector, Multiple-Pinhole SPECT System with Iodine and Indium Isotopes", in *Proc IEEE NSS-MIC*, vol. 4, October 16-22, pp. 2427-2429, 2004 and in S. C. Moore et al., "A triple-detector, multiple-pinhole system for SPECT imaging of rodents", *J. Nuc. Med*, vol. 45, pp. 97P, 2004.

Recently a new paper [M. A N Korevaar, J. W T. Heemskerk and F. J Beekman, "A pinhole gamma camera with optical depth-of-interaction elimination" Phys. Med. Biol. 54 (2009) N267-N272] has come to our attention where curved detectors fitted to pinholes were used to reduce depth of interaction effects in the detector. Further, for scintillator cameras, in US 2009/0266992 A1, (publication date Oct. 29, 2009), Dr. Beekman proposed replacing light-guides made with scintillator materials with non-scintillator material bundles (such as fiber-optics bundles). To get the best positional information from light-guides, they should be aligned to the pinhole as much as possible and a curved detector was proposed as one of the design examples in US 2009/0266992 A1.

Various descriptions of SPECT cameras, detectors and methods are given in U.S. Pat. Nos. 7,233,002, 6,943,355, 5,311,427, 5,281,821, 5,103,098 and 4,639,599, and U.S. patent application Ser. No. 11/988,947, filed Mar. 20, 2008 and published as US Patent Application Publication No. US 2009/0266992 A1, U.S. Ser. No. 12/083,383, filed Feb. 9, 2009 and published as US Patent Application Publication No. US 2009/0242775 A1, and U.S. Ser. No. 12/225,092, filed Dec. 11, 2008 and published as US Patent Application Publication No. US 2009/0114825 A1. Each of the above-identified disclosures is incorporated herein by reference in its entirety for all purposes.

A number of problems in SPECT cameras relating to resolution and sensitivity have been observed.

There is a need for a SPECT camera that provides improved resolution and sensitivity.

SUMMARY OF THE INVENTION

We show that in a SPECT camera, the best curved surface design from the point of view of reducing parallax or alignment of fibre-optics to the pinhole, would have a spherical geometry. For human cardiac applications, due to the dimensions involved, the collimator hole plays a more significant role than the parallax effect at the detector as regards consideration of resolution (as we show in simulations that appear in J. Dey, "High Performance SPECT Camera Design", in *Proc 2009 IEEE NSS-MIC*, Florida, October 2009). The best surface that minimizes the parallax error for human cardiac imaging, i.e., a sphere with center at the pinhole, is shown to yield a very modest resolution improvement (and therefore traded sensitivity) in our work: The sensitivity improvement for the spherical surface design with the center at the pinhole was about 5% in comparison to the paraboloid at 48% and the cone at 40%. A feature of our invention is to improve the magnification to minimize the net system resolution required. We have looked at paraboloid, conical and spherical surfaces and the paraboloid surface has yielded the best resolution improvement which then yielded the best sensitivity when traded with the resolution. Furthermore, in our invention we describe theoretical methods to find the best surface to minimize the resolution (considering the collimator resolution and a constant detector resolution). We do not consider the parallax effect in our formulation as it is smaller compared to the collimator effect for our application. Our approach is valid for scintillator cameras as well as gamma-cameras with semiconductor detectors.

The use of a SPECT imaging device dedicated to imaging of the breast can potentially improve the early detection and diagnosis of breast cancer. However, poor resolution can limit the detectability of small malignant breast tumors, and poor sensitivity results in longer scan times thereby increasing the chance for patient motion artifacts. The curved detector design on a configuration of pinholes around the patient's breast would provide an improved tradeoff between resolution and sensitivity over conventional flat detector designs. The dimensions of such a dedicated breast SPECT system are such that the sensitivity and/or resolution improvement due to curved detectors would be in-between the human cardiac application and the application of small animal imaging.

According to one aspect, the invention features a SPECT camera. The SPECT camera comprises a first plurality of pinhole apertures, the first plurality of pinhole apertures disposed relative to each other in a configuration calculated to receive input electromagnetic radiation emitted from a structure of interest, each of the first plurality of pinhole apertures having a respective hole diameter; a second plurality of detectors, each of the second plurality of detectors configured to present a non-planar detector surface, at least one of each of the second plurality of detectors coupled to a respective one of the first plurality of pinhole apertures at a defined location relative to the respective one of the first plurality of pinhole apertures, at least one of each of the second plurality of detectors configured to detect input electromagnetic radiation passing through a selected one of the first plurality of pinhole apertures to which it is coupled; and a third plurality of output terminals, at least one of the third plurality of output terminals configured to provide a signal representative of electromagnetic radiation detected by a respective one of the second plurality of detectors.

In one embodiment, the input electromagnetic radiation is gamma radiation.

In one embodiment, each of the second plurality of detectors configured to present a non-planar detector surface presents a paraboloid surface. In one embodiment, each of the second plurality of detectors configured to present a non-planar detector surface presents a conical surface.

In one embodiment, each of the second plurality of detectors configured to present a non-planar detector surface presents a surface described by a solution for a height function $z(\theta)$ obtained by minimizing $R_{av}$, where $R_{av}$ is given by $$R_{av} = \int_s Res^2(z(\theta), \theta) f(z(\theta), \theta) d\theta \Big/ \int_s f(z(\theta), \theta) d\theta + \lambda\left(\int_s f(z(\theta), \theta) d\theta - A_0\right).$$

In one embodiment, the respective hole diameter of each of the first plurality of pinhole apertures is configured and the non-planar detector surface of each of the second plurality of detectors is configured to provide a predefined sensitivity and a predefined resolution of the camera. In one embodiment, a number defining the first plurality of pinhole apertures is controlled to provide a predefined sensitivity and a predefined resolution of the camera. In one embodiment, the defined location of the at least one of each of the second plurality of detectors relative to the respective one of the first plurality of pinhole apertures is configured to provide a predefined sensitivity and a predefined resolution of the camera.

In one embodiment, the SPECT camera is combined with a signal conditioning component and a signal analyzer.

In one embodiment, the signal analyzer is configured to provide an image of the structure of interest to a user.

In one embodiment, the signal analyzer is configured to record an image of the structure of interest.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 6 is a diagram that illustrates the resolution and sensitivity of a paraboloid detector as compared to the Funk design. In the plots, 'o' marks the base-plane-flat-detector BFD, '◇' marks the paraboloid detector. The paraboloid height was set at H=12 cm.

FIG. 6(a) shows the resolution profiles for the BFD and paraboloid with respect to ray angle θ (angle with respect to horizontal).

FIG. 6(b) shows the average resolution vs. depth, for same hole diameter (same sensitivity). BFD resolution=LEHR's (0.8 cm) at depth 10 cm.

FIG. 6(c) shows the average resolution vs. depth for resolution of curved detectors matched to BFD at 15 cm.

FIG. 6(d) shows the central-ray sensitivity for each pinhole as in FIG. 6(c). The sensitivity improvement ratio is 1.48 per pinhole.

FIG. 7 is a diagram that illustrates the resolution and sensitivity of a cone detector as compared to the Funk design. In the plots, 'o' marks the base-plane-flat-detector BFD, '+' marks the curved detector, with the cone height set at H=12 cm.

FIG. 7(a) shows the resolution profiles for BFD and cone with respect to ray angle θ (angle with respect to horizontal).

FIG. 7(b) shows the average resolution vs. depth, for same hole diameter (same sensitivity). BFD resolution=LEHR's (0.8 cm) at depth 10 cm.

FIG. 7(c) shows the average resolution vs. depth for resolution of curved detectors matched to BFD at 15 cm.

FIG. 7(d) shows the central-ray sensitivity for each pinhole as in FIG. 7(c). The sensitivity improvement ratio is 1.4 per pinhole.

FIG. 15 is a diagram that compares detectors having different shapes with the Funk design. In the diagram, 'o' represents the base-plane-flat-detector BFD, '+' represents the curved detector, the 'diamond-shape' represents the flat-detector at Circle 2 and 'square-shape' represents the flat detector at Circle 3, the last two with the same acceptance angle as the first two.

FIG. 15(a) is a diagram that illustrates resolution vs. H (cone height) at depth b=10 cm. The BFD resolution is held at 0.8 cm, (LEHR at 10 cm).

FIG. 15(b) is a diagram that illustrates Surface Area ratios (with respect to BFD) vs. H (cone height).

FIG. 15(c) is a diagram that illustrates the diameter of the detectors vs. H (cone height).

FIG. 15(d) is a diagram that illustrates resolution vs. depth for the cone-height set at H=a=12 cm, for the same hole diameter (same sensitivity). BFD resolution=LEHR's (0.8 cm) at depth 10 cm.

FIG. 15(e) is a diagram that illustrates resolution vs. depth for resolution of curved detectors matched to BFD at 15 cm.

FIG. 15(f) is a diagram that illustrates the central-ray sensitivity for each pinhole for the embodiment of FIG. 15(e). The sensitivity improvement ratio is 1.4 per pinhole.

FIG. 16 is a diagram that illustrates the behavior of conical detectors having a small pinhole design. In the plots, 'o' represents the base-plane-flat-detector BFD, '+' represents the curved detector, the 'diamond-shape' represents the flat-detector at Circle 2 and 'square-shape' represents the flat detector at Circle 3, the last two with the same acceptance angle as the first two.

FIG. 16(a) is a diagram that illustrates resolution vs. H (cone height) at depth b=10 cm. The BFD resolution is held at 0.8 cm, (LEHR at 10 cm).

FIG. 16(b) is a diagram that illustrates Surface Area ratios (with respect to BFD) vs. H.

FIG. 16(c) is a diagram that illustrates the diameter of the detectors vs. H.

FIG. 16(d) is a diagram that illustrates resolution vs. depth for the cone height set at H=a=5 cm, for the same hole diameter (same sensitivity). BFD resolution=LEHR's (0.8 cm) at depth 10 cm.

FIG. 16(e) is a diagram that illustrates resolution vs. depth for resolution of curved detectors matched to BFD at 8 cm.

FIG. 16(f) is a diagram that illustrates the central-ray sensitivity for each pinhole for the embodiment of FIG. 16(e). The sensitivity improvement ratio is 2.16 per pinhole.

FIG. 17 is a diagram that illustrates the behavior of spherical detectors having a small pinhole design. In the plots, 'o' represents the base-plane-flat-detector BFD, '+' represents the curved detector, the 'diamond-shape' represents the flat-detector at Circle 2 and 'square-shape' represents the flat detector at Circle 3, the last two with the same acceptance angle as the first two.

FIG. 17(a) is a diagram that illustrates resolution vs. H (height, below or above, of center of curvature from base) at depth b=10 cm. The BFD resolution is held at 0.8 cm, (LEHR at 10 cm).

FIG. 17(b) is a diagram that illustrates Surface Area ratios (with respect to BFD) vs. H.

FIG. 17(c) is a diagram that illustrates the diameter of the detectors vs. H.

FIG. 17(d) is a diagram that illustrates resolution vs. depth for H=0 cm, for same hole diameter (same sensitivity). BFD resolution=LEHR's (0.8 cm) at depth 10 cm.

FIG. 17(e) is a diagram that illustrates resolution vs. depth for resolution of curved detectors matched to BFD at 8 cm.

FIG. 17(f) is a diagram that illustrates the central-ray sensitivity for each pinhole for the embodiment of FIG. 17(e). The sensitivity improvement ratio is 2.4 per pinhole.

FIG. 18A is a diagram that illustrates resolution vs. depth for resolution of curved detectors matched to BFD at 15 cm.

FIG. 18B is a diagram that illustrates the central-ray sensitivity for each pinhole. The sensitivity improvement ratio is 1.4 per pinhole.

FIG. 19 is a schematic diagram of rays incident on a detector going through the mid-point of a pinhole diameter.

FIG. 25 is a table (Table 1) that shows parameters for a flat detector.

FIG. 26 is a table (Table 2) that shows parameters for a curved detector.

DETAILED DESCRIPTION

Figure 1:
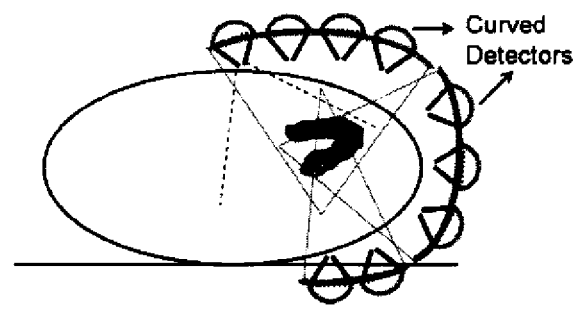
FIG. 1 is a schematic diagram that illustrates three sectors on a transverse view of pinhole apertures with detectors on a stationary configuration for a cardiac SPECT application.

Single-photon emission computerized tomography (SPECT) and Positron emission tomography (PET) are indispensable functional imaging modalities giving complementary information from commonly used structural imaging modalities like magnetic resonance imaging (MRI), computerized tomography (CT), and ultrasound. SPECT is primarily used in the clinic for cardiac applications like myocardial perfusion imaging (MPI). SPECT imaging sensitivity is impaired due to the need for collimation. Conventional SPECT system resolution is poor as well, commonly having a full width at half maximum (FWHM) of the order of 1 cm.

We describe a class of SPECT camera designs that improve resolution and/or sensitivity by using curved detectors fitted to a pinhole. This is expected to provide improved resolution over that of a flat-detector using a pinhole with the same diameter. Sensitivity vs. resolution trade-off can then be used to get increased sensitivity for similar resolution as the flat-detector. Furthermore there are tunable surface-parameters if an application calls for greater sensitivity and/or resolution, without increasing the compactness (base-diameter) of the design. We have derived expressions for average resolution for some curved detectors such as the paraboloid detector, the cone-detector and the spherical detector. We have simulated the resolution and sensitivity improvement for an illustrative example using curved detectors for an orbit designed for cardiac application. For an example conical-design, for cardiac SPECT application, the sensitivity improvement over a multi-pinhole system such as that of Funk et al. was 40-75%. The sensitivity improvement of the curved detector over the clinical systems currently used in the clinic for cardiac imaging using LEHR parallel collimation was a factor of 7-9, with resolutions close to that of LEHR in the region of interest.

We describe paraboloid, conical, and spherical detectors. We have analyzed the resolution and sensitivity improvement for illustrative paraboloid, conical and spherical detectors for a stationary configuration of pinholes focused in a region in the object space, designed for cardiac application. For a paraboloid design, for cardiac SPECT application, the estimated sensitivity improvement over a multi-pinhole system such as that of Funk et al. was 48-85% for similar resolution. For a conical design, the expected improvement was 40-75%. The sensitivity improvement of the curved detector system over the clinical systems currently used in the clinic for cardiac imaging (using LEHR parallel collimation) was a factor of 7.4 to 9.3 for an illustrative paraboloid detector and 7 to 9 times for an illustrative conical detector, with resolutions close to that of LEHR parallel collimation in the region of interest. In our analytical system, there are tunable surface-parameters (such as height) that can be changed to adjust sensitivity and/or resolution, without changing the compactness (base-diameter) of the design. It is expected that the performance of the illustrative paraboloid and conical designs will be better than the spherical design for this application. It is believed that there exists an optimum surface of the curved detector yielding the best improvement of resolution and/or sensitivity.

In the following, the description of detectors as being non-planar, conical, spherical, or paraboloid (or having any other non-planar description) is to be understood to denote a detector that is designed to have a surface that is non-planar, and which can be constructed from a single object having the specified surface geometry, or which can be constructed from a plurality of detector elements, which as a composite provide a structure having the specified geometry. By way of example, one could make a detector having a spherical surface geometry by machining a block of material such as NaI so as to generate a body having a surface that is spherical in shape. Alternatively, one could approximate the spherical surface either by assembling a plurality of elements, each of which represents a segment of a spherical surface, so that the assembly has a substantially spherical surface, or by providing a plurality of elements, each of which represents an approximation to a segment of a spherical surface, such as a plurality of flat hexagonal elements having chamfered sides, so that the assembly has an approximately spherical surface. The surface is one upon which gamma radiation (or electromagnetic radiation) falls and is detected in the detector. In the typical medical application, the gamma radiation is emitted from a structure of interest in or on a subject or patient upon which perfusion with a selected emitter has been performed. The detector provides at an output terminal an output signal representative of the gamma radiation that it has detected, which signal can include information about intensity, wavelength or frequency, and direction of propagation of the emitted gamma radiation, for example based on geometric features of a pinhole aperture through which the detected radiation has passed. The output signal is then processed using one or more electronic components, such as a signal conditioning component, such as an amplifier, an averager, or a discriminator, and analyzed using a signal analyzer, such as a computer system, a general purpose computer programmed with instructions in software, or a specially designed dedicated analyzer. The gamma radiation, after being detected and analyzed, provides information about the structure of interest, including image information. In some embodiments, an image or other output is displayed to a user, and/or stored. A system using a camera comprising detectors according to the description given herein can also include components designed to locate the camera/detector relative to the object to be imaged and to control the operation of the detector, for example as a function of time.

In conventional systems, SPECT imaging sensitivity is impaired due to the need for collimation. Conventional system resolution is poor as well (FWHM~1 cm). In conventional systems, there is a desire to use small detectors that are close to the region of interest, acquiring data at different angles simultaneously. Recently curved detectors have been used in pinholes for small animal imaging for purpose of reducing parallax effect on the resolution by collecting light from fiber optics bundles placed normal to the curved detector surface.

For human cardiac applications, due to dimensions involved and higher sensitivity requirements, the collimator hole or aperture plays a more significant role as regards resolution considerations than the parallax effect at the detector, as we have demonstrated in simulations. We describe a novel method to improve sensitivity and/or resolution over flat-detector-pinhole designs by using appropriately curved detectors fitted to pinhole apertures in a configuration illustrated in FIG. 1. It is expected that one can obtain improved resolution due to improved magnification over that of a flat detector, for the same base extent (compactness). Sensitivity versus resolution trade-off can then be used to get better sensitivity for similar resolution as that of a flat (or planar) detector, by increasing the diameter of the pinhole.

If we simply increased the distance from detector to pinhole for a flat detector pinhole system and traded the resolution improvement with sensitivity, for the same field of view and constraints, we find that a significantly smaller number of pinholes can be accommodated, resulting in an overall loss of sensitivity over a system using curved detectors.

In our design in FIG. 1, we place curved detectors on the pinholes with the purpose of improving magnification and then, as may be helpful, trading off the resolution improvement for an increase in sensitivity.

Let us consider the resolution improvements of the curved surface over a hypothetical flat-detector at the base (called Base Flat Detector or BFD). The resolution for the pinhole system with a flat detector is given by $$Res = \sqrt{\left[1+\frac{b}{a}\right]^2 d^2 + \left[\frac{b}{a}\right]^2 R_I^2}$$

where $a$ is the distance from the pinhole to detector and b is the depth of interest. Ignoring parallax or penetration effects for now, this quantity is geometrically independent of the incident angle of the ray, since the magnification is independent of incident ray angle. The resolution of the curved detector, however, is dependent on the incident angle because the magnification changes with incident angle. The resolution is higher than the base-flat-detector system at the central-incident-rays and falls off gradually to be equal to that of the base-flat-detector system towards the edge. We use the average resolution for a curved detector for system-design.

Average Resolution for a Curved Detector

Expressions for the average resolution may be derived by integrating the square-of-the-resolution function over the surface, normalizing by the surface area and then taking the square root thereof. One can either represent the resolution function as a function of the surface variables, or represent the surface variables in terms of the ray-angle θ (with respect to the horizontal), shown in FIG. 3, FIG. 4 and FIG. 5.

Paraboloid

We derive the average squared resolution over the surface of the paraboloid with height H and base radius R, (see FIG. 3), on a pinhole with parameters a, b, as follows:

$$Res_{av}^2 = \left[\frac{\int Res^2(\theta) dA}{\int dA}\right] = \frac{\int_0^H Res^2(\theta) \frac{(H^4+4R^2 Hh)^{(1/2)}}{2h} dh}{\int_0^H \frac{(H^4+4R^2 Hh)^{1/2}}{2h} dh} =$$

$$\frac{\int_0^H \left[\left(1+\frac{b}{a+H-h}\right)^2 d^2 + \left(\frac{b}{a+H-h}\right)^2 R_I^2\right]\frac{(H^4+4R^2 Hh)^{1/2}}{2h} dh}{\int_0^H \frac{(H^4+4R^2 Hh)^{1/2}}{2h} dh}$$

Cone

Figure 4:
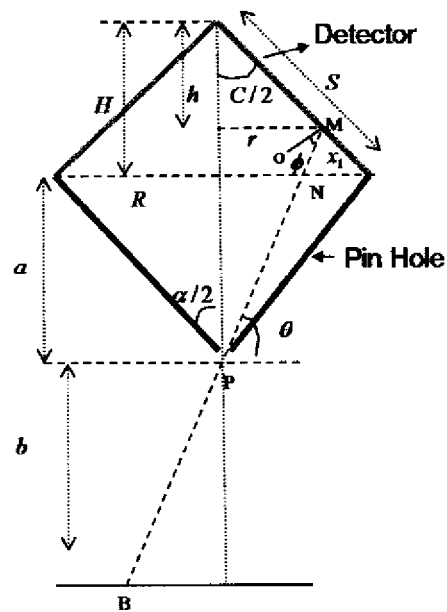
FIG. 4 is a cross-sectional diagram illustrating a profile of a cone detector with a pinhole aperture.

Referring to FIG. 4, for a conical surface of height H, the average squared resolution is given by $$Res_{av}^2 = \left[\frac{\int Res^2(\theta) dA}{\int dA}\right] =$$

$$\frac{\int_0^H Res^2(\theta) h \, dh}{\int_0^H h \, dh} = \frac{\int_0^H \left[\left(1+\frac{b}{a+H-h}\right)^2 d^2 + \left(\frac{b}{a+H-h}\right)^2 R_I^2\right] h \, dh}{\frac{H^2}{2}}$$

where H is the height of the cone above the BFD.

Sphere

Figure 5:
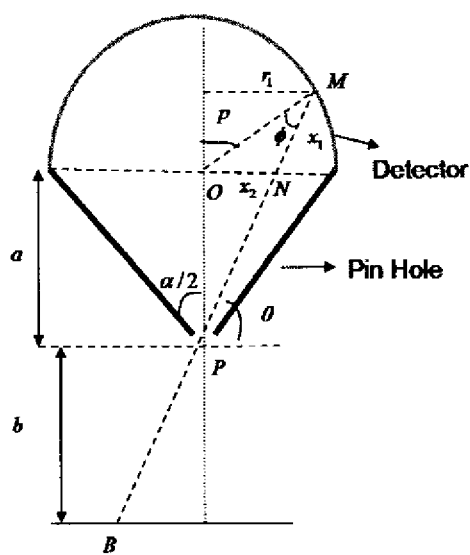
FIG. 5 is a cross-sectional diagram illustrating a profile of a sphere detector with a pinhole aperture.

For a sphere the average resolution squared is given by $$Res_{av}^2 = \left[\frac{\int Res^2(\theta) dA}{\int dA}\right] = \frac{\int_{\frac{\pi}{2}-\frac{\alpha}{2}}^{\frac{\pi}{2}} Res^2(\theta)[x_1 \cos(\theta) + (x_1)_\theta \sin(\theta)] d\theta}{\int_{\frac{\pi}{2}-\frac{\alpha}{2}}^{\frac{\pi}{2}} [x_1 \cos(\theta) + (x_1)_\theta \sin(\theta)] d\theta}$$

where $$x_1 = -(a \mp H)\frac{\cos^2(\theta)}{\sin(\theta)} + \sqrt{(a^2 \tan^2(\alpha/2) + H^2) - (a \mp H)^2 \cos^2(\theta)} \mp \frac{H}{\sin(\theta)}$$

and $(x_1)_\theta$ is the derivative of $x_1$ with respect to the incident angle θ. The terms in square brackets in numerator and denominator represents the factor of conversion from one of the spherical co-ordinate angles to the incident angle θ. The expression for $(x_1)_\theta$ is omitted for brevity. The variable H represents the height of the center of sphere "above" or "below" the BFD. In the case of the center of the sphere "above" the BFD, the + sign applies, and for the center of the sphere "below" the BFD, the negative sign applies. In FIG. 5, we illustrate the case for H=0 where the center is at the mid-base.

Figure 3:
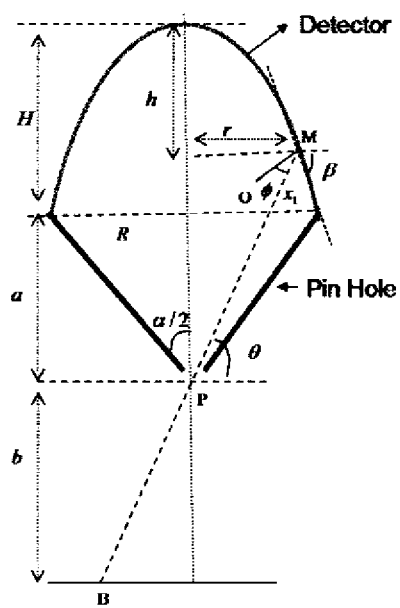
FIG. 3 is a cross-sectional diagram illustrating a profile of a paraboloid detector with a pinhole aperture.

Referring to FIG. 3-FIG. 5, in the three preceding equations, $$Res^2(\theta) = \left[1 + \frac{b/\sin(\theta)}{\frac{a}{\sin(\theta)} + x_1}\right]^2 d^2 + \left[\frac{b/\sin(\theta)}{\frac{a}{\sin(\theta)} + x_1}\right]^2 R_l^2$$

we are able to simplify further in the case of the paraboloid and the cone to get the forms given above. From circular symmetry we could reduce the surface integrals to ratios of single integrals.

Considering the septa-penetration approximately the effective pinhole diameter is $$d = \sqrt{d_0(d_0 + 2\mu^{-1}\tan\alpha/2)},$$

where $d_0$ is the actual physical hole diameter and $\mu$=21.66 cm$^{-1}$ is the linear attenuation coefficient of lead at 150 keV. The average resolution is calculated in simulation by numerical integration of the above equations and then taking the square root.

Number of Pinholes

Figure 2:
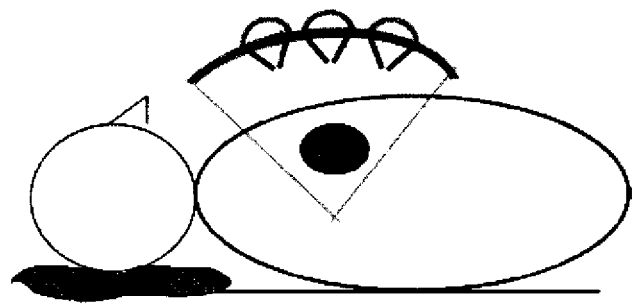
FIG. 2 is a schematic diagram that illustrates one of the sectors along a longitudinal axis of the cardiac SPECT application illustrated in FIG. 1.

Referring to FIG. 1 and FIG. 2, the pinholes are arranged in surfaces around the torso of a human subject or patient. To adapt to the patients' body contour, the geometry is divided into three regions, as illustrated in the transverse cross-section of the body in FIG. 1. The largest sector has angular arc of 120 deg, second one of 75 deg, and the last one of 45 deg. In FIG. 2 we show one of the cross-sectional sectors of the surface in the axial direction. The two dimensional surface spanned by the corresponding arcs in the transverse and axial directions will accommodate a two-dimensional array of detector-pinhole pairs over the body contour around region of interest. The detector bases for each pinhole-detector-pair are aligned along the sectors. From practical considerations, some buffer is necessary when calculating the number of pinholes to be accommodated. The number of pinholes accommodated in the geometrical configuration can be roughly calculated by $$N \approx \frac{R_{t1}\theta_{t1} \times R_{a1}\theta_{a1} + R_{t2}\theta_{t2} \times R_{a2}\theta_{a2} + R_{t3}\theta_{t3} \times R_{a3}\theta_{a3}}{\text{diameter} \times \text{diameter}}$$

where diameter is the detector-pinhole base-extent-diameter (or "diameter") including some buffer to accommodate the detector and pinhole in the curved surface geometry. $\theta_{ti}$ or $\theta_{ai}$ are the sector angle in radians for i=1, 2, 3 in the transverse and longitudinal axial directions, with $R_{ti}$ and $R_{ai}$ are the corresponding radii of the sectors in the two directions. Note that $R_{ti}\theta_{ti}$ is the sector arc length in transverse direction and $R_{ti}\theta_{ti} \times R_{ai}\theta_{ai}$ is the product of the arc-lengths in the two directions. Each pinhole in the geometrical configuration has to cover the entire object of interest to avoid truncation. Data from all the detector-pinhole sensors (colloquially "pinholes") will be acquired simultaneously. Thus an adequate number of pinholes are needed such that there are enough views of the region of interest (ROI) to reconstruct the object. In Funk et al., although the geometry was different, 4 views with 9 pinholes in each view (or 36 pinholes) were adequate for a good-quality reconstruction without artifacts. Note that in FIG. 1 the design shows a general case. The radii of the different sectors could be chosen to be different or the same.

Once we have obtained the average resolution, and the number of pinholes used we can calculate the resolution and sensitivity improvement for example cases of paraboloid, conical and spherical detectors for a stationary configuration of pinholes arranged specifically for a cardiac application.

Parallax (Depth of Interaction) Effect at the Detector

Oblique incidence at the detector degrades resolution. If all the incident rays are normal to the surface the parallax effect is minimized. For this constraint to be satisfied, the surface is limited to a sphere with its center at the pinhole P (that is, a sphere with H=−a according to our notation). However the surfaces that are the best from the point of view of optimum magnification are not necessarily the best from the detector parallax point of view, and vice-versa. Hence for our surfaces, we analyzed the resolution degradation effect due to the parallax error of the detectors.

We used the point-spread-function derived by Que and Rowland et al., which is modeled as a decaying exponential, $$PSF(x, y) = \delta(y)S(L\tan\phi - x)S(x)\frac{\mu_d}{2\sin\phi}\exp(-\mu_d x/\sin\phi),$$

where S is the step function, which is 1 if the argument is positive and 0 otherwise. L is the detector thickness, $\phi$ is the angle of incidence of the ray at the detector surface, and x is the horizontal distance measured from point of incidence. The $\mu_d$ is the linear attenuation coefficient of the detector material. We used $\mu_d$=3.097 cm$^{-1}$ as the linear attenuation coefficient of NaI at 140 keV photon energy. The detector thickness was L=0.9525 cm (⅜ inches). At normal incidence the PSF reduces to a delta function. The above expression is called the Que-Rowland kernel. Note that the kernel is anisotropic.

We first analytically derived the incident angle $\phi$ at the detector surfaces (see FIG. 3 through FIG. 5) for a ray angle $\theta$ and computed the full-width-half-max (FWHM) of the parallax kernel. The computation assumes a locally-flat (tangent-plane) approximation for the curved surfaces, which is a good approximation for the length L considered.

Resolution and Sensitivity

In FIG. 3, FIG. 4 and FIG. 5 the parameters a, $\alpha$ and the depth b at which the pinholes are pointed at are guided by the physiology imaged. We chose these to be similar to the Funk design. Thus a=12 cm, the pinholes are pointed at depth b=20 cm from the pinhole and the acceptance angle $\alpha$=45.24 deg.

Paraboloid Detector

For a paraboloid of height H=12 cm, the sensitivity improvement per pinhole was 48% as compared to base-flat-detector pinholes. The results are shown in plots in FIG. 6.

Resolution Profile

In FIG. 6A the resolution profile across the paraboloid and the hypothetical base-flat-detector (BFD) is compared at depth 15 cm with respect to ray-angle $\theta$. The hole diameter is such that the resolution of BFD is that of LEHR (0.8 cm) at 10 cm depth. We observe that while the BFD resolution is held flat at 1 cm (at 15 cm depth), the paraboloid-detector resolution goes from being equal to that of BFD at the extreme end to 0.698 cm or about ~30% less (improved) at the center.

Higher-Resolution Design

In FIG. 6B we compared the average resolution versus depth of a paraboloid detector with that of the BFD for the same pinhole diameter. The diameter is such that the resolution of BFD is that of LEHR (0.8 cm) at 10 cm depth. The average is calculated as previously described. As expected, the resolution improvement with the curved detector compared with BFD is always better and also that the improvement increases with depth. Since the diameters are the same, the sensitivities will be the same for the two. The average resolution over a depth of 8-20 cm improves from 0.97 cm for the BFD to about 0.82 cm for the paraboloid (since smaller resolution size is better).

High-Sensitivity Design

In FIG. 6C and FIG. 6D, we increased the hole diameter of the pinhole of the curved detector such that the resolution matches the resolution of the BFD at 15 cm. Now the resolution of the curved detector pinhole is close to that of the BFD throughout the depth of interest. The sensitivity increased by a factor of 1.48 per pinhole, throughout the depth of interest for the curved over the BFD (FIG. 6D). In FIG. 6D, even though the absolute sensitivity is lowered with depth for each of curved detector and BFD, as expected due to the sensitivity falling off as $1/depth^2$, the improvement ratio remains the same across depth (due to different hole diameters). Thus if we kept the number of pinholes of the two systems same, we get a 48% improvement over Funk's design without compromising resolution significantly. The resolution of the paraboloid detector case at depth 10 cm is about 0.83 cm which is close to that of LEHR (0.8 cm).

Sensitivity Gain Factor Due to Number of Pinholes

In general, there should be a linear sensitivity gain for more pinholes added to a distributed pinhole system such as in FIG. 1. However, the Funk design is different in that it is a multi-view multiple-pinhole system connected to standard detectors. Hence the sensitivity comparisons have to be done carefully. In the Funk design, each of the 9 pinholes attached to the standard detector obtains a full view of object and acquire simultaneously. Four views (or 36 pinholes in total) are needed for artifact free reconstruction. Assuming that the 4 views (with 9 pinholes each view) can be actually accommodated in the clinic for simultaneous acquisition, that system would be a factor of 5 more sensitive than if LEHR collimators were attached to the 4 detectors. For our design the number of pinholes is 48, so we conservatively use N=45, all acquiring projection counts simultaneously, distributed along the geometric configuration defined in FIG. 1. Hence we have 9 extra (45−36) pinholes by virtue of our distributed configuration. This would lead to a gain factor of 1.25 in sensitivity. Hence in addition to a sensitivity factor improvement of 1.48 for each pinhole due to the curved detectors, if we account for the increased number of pinholes for our geometry, we would get a net factor of 1.85 gain over the Funk design.

Comparison with Clinical System

Now we can indirectly compute our improvement over the standard clinical system, using the measurements and comparisons performed by Funk et al between their system and the clinical system. Whereas Funk et al estimated sensitivity improvement factor of 5 over a camera system with LEHR collimators used in the clinic, the paraboloid curved detector would get a sensitivity improvement factor of 5×1.48=7.4 if we used the same number of total pinholes, keeping similar resolution as LEHR across the depth of interest. However the surface area of the curved detector increased with respect to the base BFD by 3.38 times for each pinhole. If we increased the number of pinholes to the allowable limits of our system, the improvement of sensitivity is approximately a factor of 9.3.

Conical Detector

For a cone of height H=12 cm, the sensitivity improvement per pinhole was 40% as compared to base-flat-detector pinholes. The results are shown in plots in FIG. 7.

Resolution Profile

In FIG. 7A the resolution profile across the cone and the base-flat-detector (BFD) is compared at depth 15 cm with respect to ray-angle θ. The hole diameter is such that the resolution of the BFD is that of LEHR (0.8 cm) at 10 cm depth. While the BFD resolution is held flat at 1 cm (at 15 cm depth), the paraboloid detector resolution goes from being equal to that of BFD at the extreme end to 0.71 cm or an improvement of ~30% at the center.

Higher-Resolution Design

In FIG. 7B we compare the average resolution vs. depth of a cone detector with that of the BFD for the same pinhole hole diameter. The average is calculated as previously described. The curved detector always shows resolution improvement as compared with BFD. The improvement increases with depth, for the same sensitivity. The average resolution over a depth of 8-20 cm drops from 0.97 cm for the BFD to about 0.84 cm for the cone.

High-Sensitivity Design

In FIG. 7C and FIG. 7D, we increased the hole diameter of the pinhole of the curved detector such that the resolution matches the resolution of the BFD at 15 cm. As shown in FIG. 7D the sensitivity increased by a factor of 1.40 per pinhole, throughout the depth of interest for the curved detector as compared to the BFD. Thus if we kept the number of pinholes of the two systems the same, we get a 40% improvement over Funk's design without significantly compromising resolution. The resolution of the curved detector case at depth 10 cm is 0.83 cm which is close to that of LEHR (0.8 cm).

Comparison with Clinical System

We can calculate our improvement over the standard clinical system represented by the Funk design. The conical curved detector exhibits a sensitivity improvement factor of 5×1.40=7.0 if we used the same number of total pinholes, keeping similar resolution as LEHR across the depth of interest. If we increased the number of pinholes to the allowable limits of our system (as explained for the paraboloid case), the improvement of sensitivity is 7.0×1.25=9 times.

Spherical Detector

The computed performance of the sphere was worse than the paraboloid or the cone. At H=0 where the center of the sphere is at the mid-point of the base of the pinhole, the sensitivity gain was at 27% percent as compared to the BFD. At higher H, with the center above the base it is possible to get higher sensitivity; however the compactness will suffer, because the diameter of the sphere would then be more than the base-flat-detector's diameter and a smaller number of pinholes may be accommodated.

Another design of interest represents an embodiment in which the parallax error is the least, with a sphere centered at the pinhole, such that all the rays are normally incident on the detector surface. However at this setting, the improvement of sensitivity over the base-flat-detector was modest at only 5%.

Changing Design Parameter (Height H) for Curved or Flat Detectors

Figure 8:
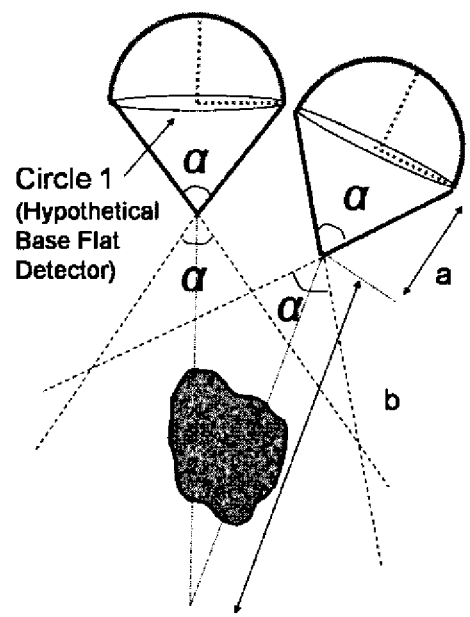
FIG. 8 is a schematic diagram that illustrates the detection geometry of curved detectors with pinhole apertures focused on a region of interest at a distance b from each pinhole.
Figure 9:
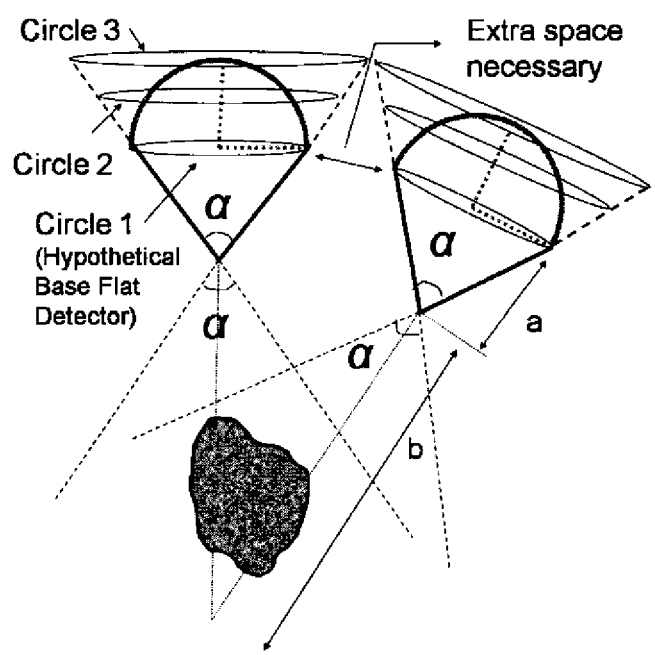
FIG. 9 is a schematic diagram that illustrates hypothetical flat detectors at different locations (e.g., Circle 1, Circle 2, Circle 3) for comparison, using the same a and b parameters and acceptance angle α of the pinhole. Instead of the curved detectors on the base-plane shown in FIG. 8, if the detector was a larger flat one at the tangential plane on the top, indicated by Circle 3 (or at Circle 2 with the same surface area as the curved detector), extra space would be necessary to pack the detectors into the same configuration focused at distance b in object space, resulting in a relatively smaller number of pinholes available for detection of radiation.

FIG. 8 shows curved detectors with pinholes focused on a region of interest at a distance b from the pinhole. In FIG. 9, using the same pinhole design parameters (a and b parameters and acceptance angle α of the pinhole), we show flat detectors at different locations (Circle 1, Circle 2, and Circle 3) for comparison. Instead of the curved detector on the base-plane shown in the embodiment of FIG. 8, if the detector was a larger flat one at a tangential plane at the top indicated by Circle 3 (or at Circle 2 with the same surface area as the curved detector), shown in FIG. 9, extra space would be necessary to pack the pinholes and detectors into the same configuration focused at distance b in object space, resulting in a relatively smaller number of pinholes.

Figure 10:
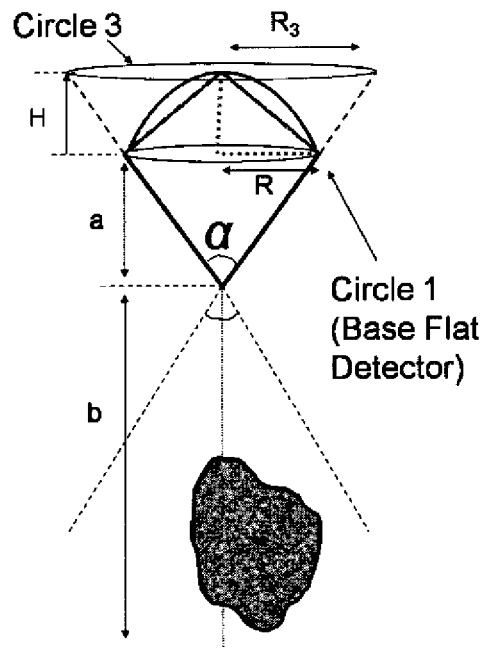
FIG. 10 is a schematic diagram used to analyze the effect of changing Hon sensitivity performance for a paraboloid, a conical and a tangential flat detector (represented by Circle 3) at height H, compared to the base flat detector (BFD, Circle 1).
Figure 11:
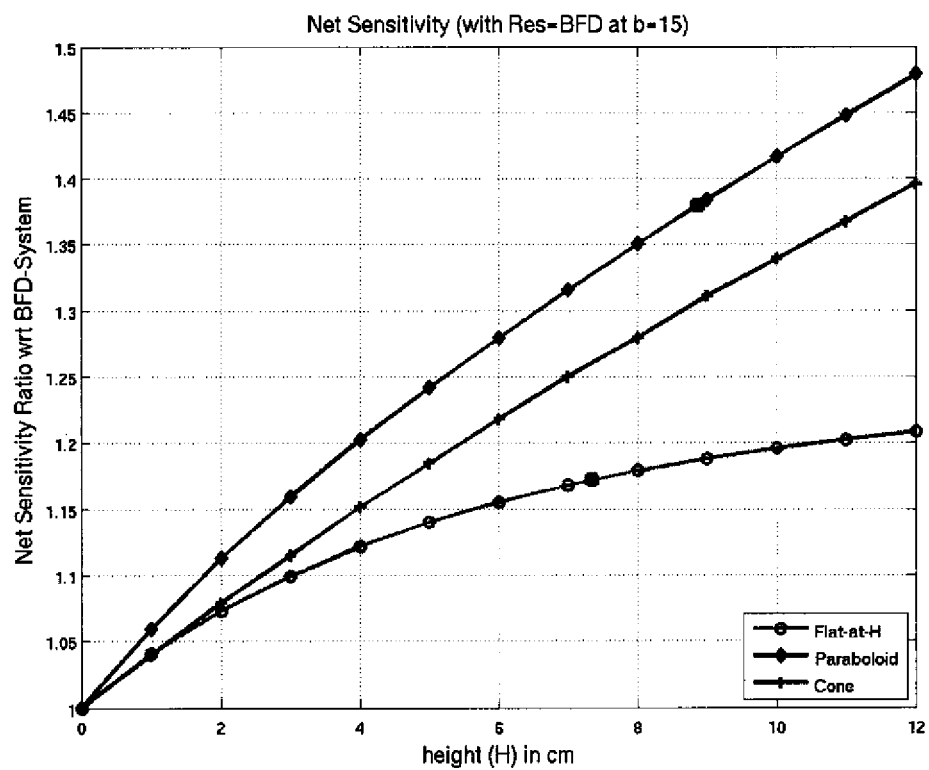
FIG. 11 is a diagram that illustrates and compares as a function of height H the Net Sensitivity ratio of a paraboloid detector, a cone detector, and a flat detector to the base flat detector.

As illustrated in FIG. 10, we want to quantitatively compare the net system sensitivity gain (sensitivity gain for each pinhole times the number of pinholes) over a base-flat-detector-system as a function of the height H of the paraboloid, the cone, and the flat-detector (Circle 3). The pinhole dimensions, a, b and α are chosen as before (similar to Funk). For the three sets, average resolution is maintained the same as the BFD at 15 cm. For the cone or paraboloid the base-extent is the same as the BFD. Therefore, we can incorporate the same number of pinholes as in the BFD-system. However, for a flat detector at height H the diameter is larger, and we can accommodate fewer and fewer pinholes as the value of H increases. Thus there are two competing factors for the flat-detector: higher H implies higher surface area implying more sensitivity gain per pinhole (by trading off the resolution gain with sensitivity) but it also implies fewer pinholes. In FIG. 11, we compare the net sensitivity improvements as a function of the height parameter H for a flat detector, a paraboloid detector and a cone detector. We see that for a flat detector at height H about the BFD (or a net focal distance of (a+H)), the overall system sensitivity is always less than the paraboloid (or cone) and the difference increases with H. In other words, the system of pinholes with flat detector at H would have less overall sensitivity due to the smaller number of pinholes that can be accommodated in the system. The smaller number of pinholes may also indicate an inadequate number of angles acquired and reconstruction artifacts may result.

Figure 12:
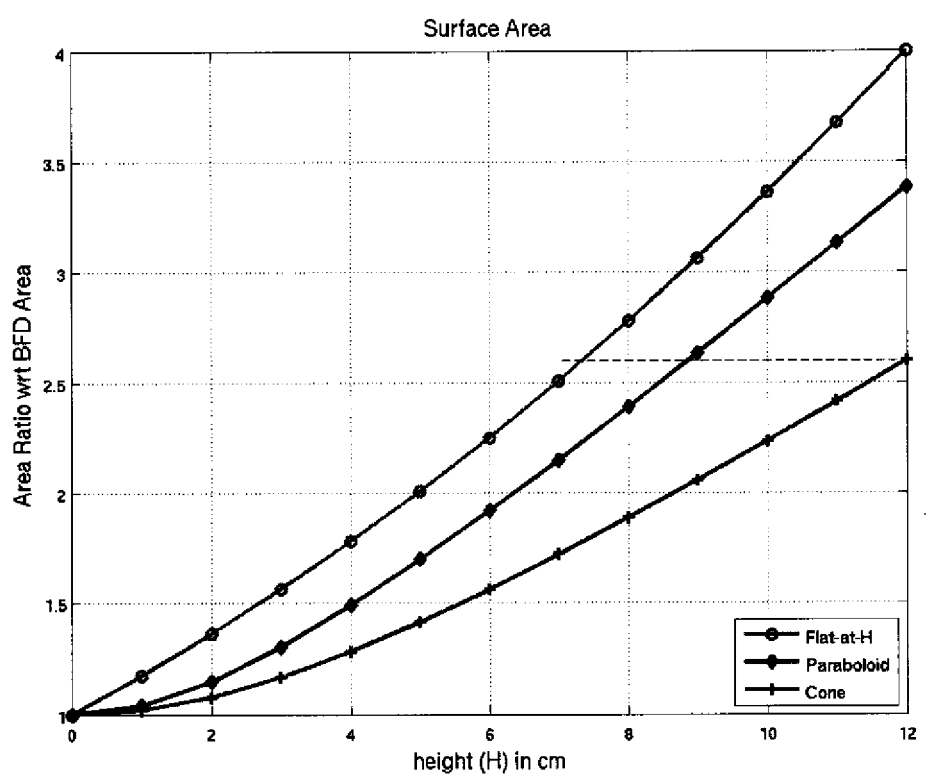
FIG. 12 is a diagram that illustrates and compares as a function of height H the Surface Area ratio of a paraboloid detector, a cone detector, and a flat detector to the base flat detector.

Comparing the paraboloid detector with the cone detector, there is more sensitivity to be gained with the paraboloid detector at the same height H. For example at H=12, the paraboloid is 1.48 times more sensitive than BFD while the cone is 1.4 times more sensitive. However as shown in FIG. 12 the surface area of the paraboloid is higher for the same height as the cone. If we then compare the paraboloid at lesser height (at H=8.87 cm) with the same surface area as the cone at H=12, we find that the paraboloid has less sensitivity at 1.38 as compared to the cone at 1.4.

Thus from the sensitivity point of view, the paraboloid is the best of the three surfaces considered. However the cone is better when we take the surface area into consideration. This indicates that there is expected to be an optimum surface shape which minimizes the radius for the least surface area for the same base-extent (diameter).

Parallax Effect (Depth of Interaction) at the Detector

Figure 13:
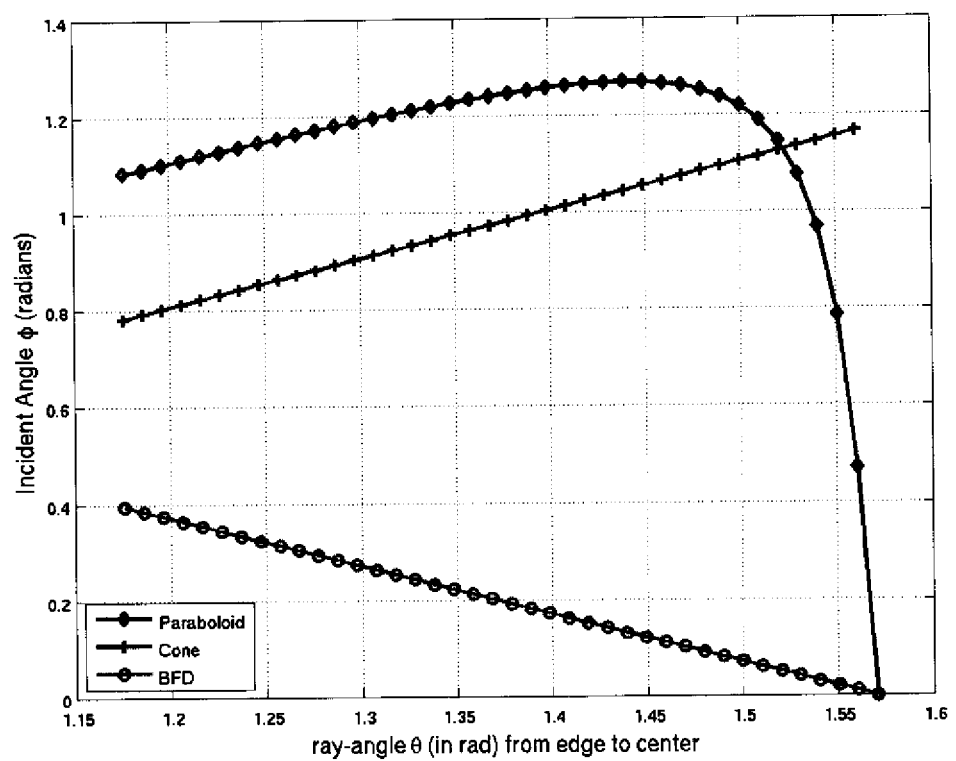
FIG. 13 is a diagram that illustrates the angle of incidence φ at surfaces with respect to the ray angle θ for a paraboloid detector, a conical detector (with H=12) and the BFD.
Figure 14:
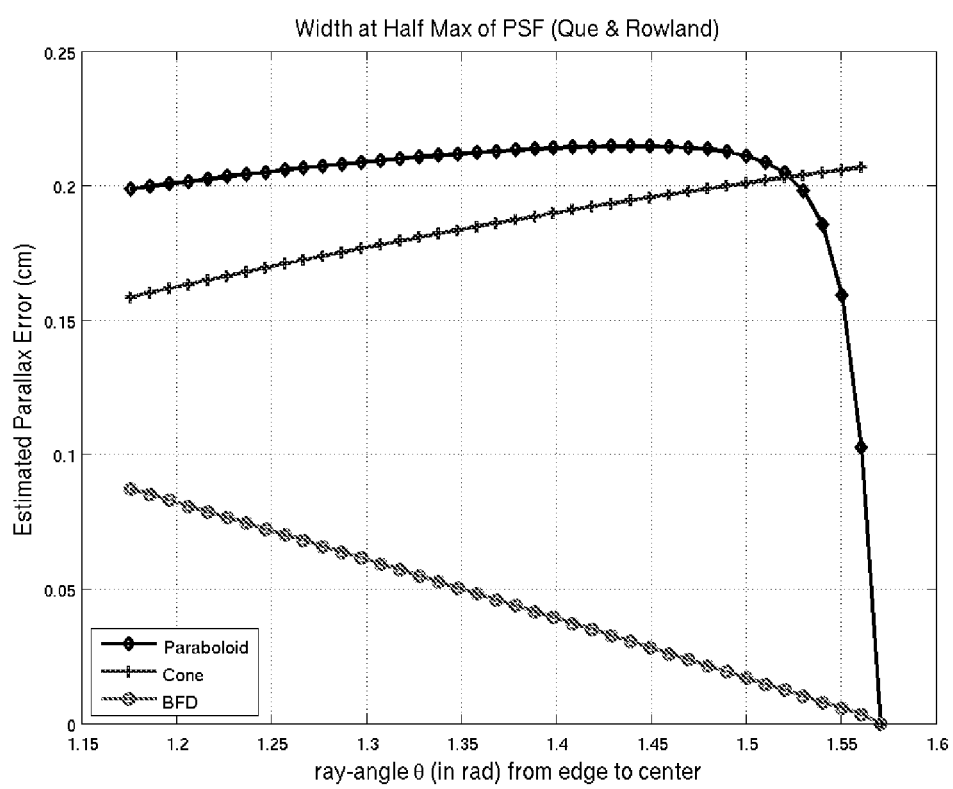
FIG. 14 is a diagram that illustrates the estimated parallax error using FWHM for the point spread function for a paraboloid detector, a conical detector (with H=12) and the BFD.
Figure 20:
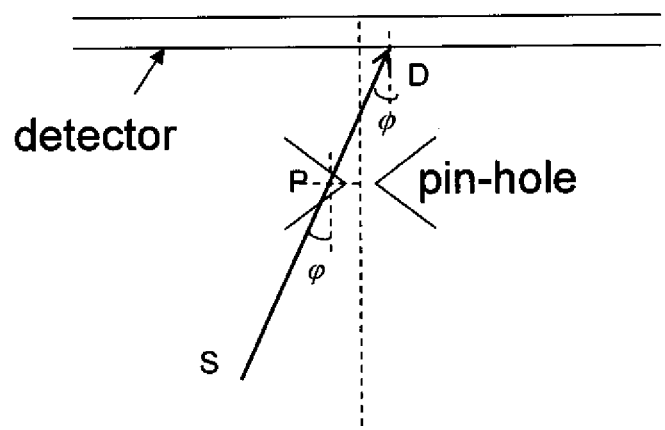
FIG. 20 is a schematic diagram of one of the rays through the extremities of the pinhole contributing to one of the PSFs.
Figure 21:
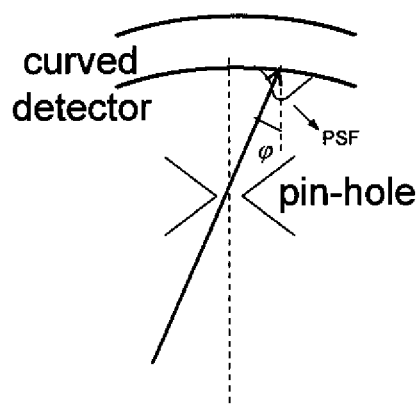
FIG. 21 is a schematic diagram of a ray incident on a curved detector going through the mid-point of a pinhole diameter
Figure 22:
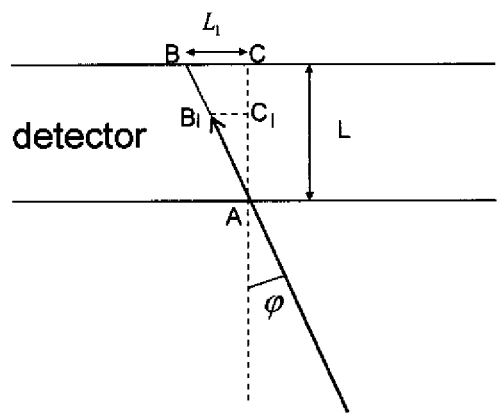
FIG. 22 is a schematic diagram of detection within a flat detector for an oblique ray.
Figure 23:
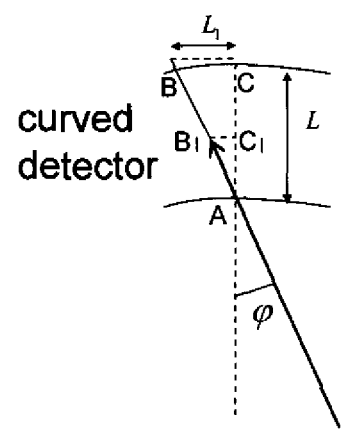
FIG. 23 is a schematic diagram of detection within a curved detector.

The incident angle and the Full-Width-Half-Max (FWHM) of the Que-Rowland kernel for parallax is calculated. FIG. 13 and FIG. 14 illustrate the incident angle and the FWHM for a paraboloid and a cone at height H=12 cm. It is instructive to see that the incident angle on the paraboloid surface was mostly higher than the cone (and both more than that at the BFD surface) as we go from the edge towards the center. For the paraboloid the incident angle falls off sharply to zero at the center (where the ray is at normal incidence). The cone will have a discontinuity at the center, which needs to be rounded to a smooth curve in practice. We observe in FIG. 14 for the paraboloid and the cone, the parallax effect mostly increases with ray angle, as we go from the edge to the center while for the BFD it decreases steadily to zero. For the paraboloid it plunges sharply down to zero at the center. However the maximum parallax error is 0.21 cm, which is of the order of the intrinsic resolution of the detector and about a factor of 5 less than the system resolution at mid-depth (~1 cm). This effect contributes in an orthogonal manner to the overall resolution. Therefore, for the cardiac application, the net contribution of the parallax effect on system resolution is small and secondary. Furthermore, it can be modeled using an iterative reconstruction algorithm to correct for it.

Design of Cone Detector

FIG. 15 is a diagram that compares detectors having different shapes with the Funk design. The detector properties are shown with respect to a design parameter, the height H of the cone detector.

Diagrams presented in FIG. 15(a) through FIG. 15(c) show the resolution, surface area and the extent-diameter respectively for the curved (marked '+'), and BFD i.e., the base flat detector at Circle 1 (marked 'o'), flat detectors Circle 2 (marked with a 'diamond') and at Circle 3 (marked with a 'square').

We see that even though the resolution is lower for the flat detector at Circle 2, or Circle 3 as expected, the diameter-extent is increased and for Circle 3 the surface area is also increased substantially. As shown in FIG. 9, we would be able to use a smaller number of the pinholes compared to the BFD or the curved detector if we used flat detectors at Circle 2 and Circle 3. First we compare the curved and the BFD designs for high resolution and high sensitivity settings. Then we compare high-sensitivity designs between curved-system and those at Circle 2 and Circle 3.

Higher Resolution Design

In the fourth plot (FIG. 15(d)), we chose a cone of height H=a=12 cm and compared the resolution vs. depth, with that of the BFD for the same pinhole hole diameter. The hole diameter is such that the BFD is at the same resolution as that of LEHR (0.8 cm) at 10 cm depth. As expected, the resolution improvement with the curved detector compared with BFD is always better and the improvement increases with depth. Since the hole diameters are the same, the sensitivities will be the same for the two. Therefore for the same sensitivity, the curved detector shows a resolution gain of 16% (mid-depth) and average gain of about 15% from 8-20 cm, with respect to the BFD-flat detector (which is kept at LEHR resolution at 10 cm depth).

Higher Sensitivity Design

In FIG. 15(e) and FIG. 15(f) the hole diameter of the pinhole of the curved detector is increased such that the resolution matches the resolution of the BFD at 15 cm. For this embodiment the resolution of the curved detector pinhole is close to that of the BFD throughout the depth of interest. The sensitivity increased by a factor of 1.40 per pinhole, throughout the depth of interest over the BFD (FIG. 15(f)). Even though the absolute sensitivity is lowered with depth for each of curved detector and BFD, as expected due to the sensitivity falling off as $1/b^2$, the improvement ratio remains the same across depth. This indicates whereas Funk estimated sensitivity improvement by a factor of 5 over a SPECT cardiac camera system with LEHR collimators used in the clinic, the curved detector is expected to exhibit a sensitivity improvement by a factor of 7 if we use the same number of total pinholes for similar resolution as LEHR across the depth of interest. The resolution of the curved detector case at depth 10 cm is 0.83 cm which is close to that of the LEHR (0.8 cm). However the surface area of the curved detector increased with respect to the base BFD by 2.6 times for each pinhole.

Sensitivity Gain Factor Due to Number of Pinholes

As previously discussed, because our design uses 45 pinholes as compared to 36 pinholes in a Funk design, we gain an improvement factor of 1.25. This factor comes from additional pinholes in the system acquiring counts simultaneously. Thus, we have an improvement of 1.4×1.25=1.75 over the Funk design. Therefore we would get a factor of 9 improvement in net sensitivity over LEHR for a similar resolution.

Higher Sensitivity Design Matching Resolution to Circle 2

We can increase the hole diameter of the pinhole even further for the Circle 2 flat detector system as well as for the curved detector system, such that the resolution of the Circle 2 system matches the resolution of the BFD at 15 cm. The sensitivity is increased by a factor of 1.78 per pinhole, compared to the BFD throughout the depth of interest. The resolution of the Circle 2 is now similar to that of LEHR in the depth of interest while that of curved detector is 9% lower at depth 10 cm. However we can accommodate only about 32 cameras for Circle 2 when we could accommodate 48 for the curved detector. Hence there would be a factor of 32/48=0.67 decrement of sensitivity for Circle 2 over the curved detector, or a net drop of 33% in sensitivity of a Circle 2 system over a curved detector system.

Using another method of comparison, if we kept different hole diameters for the Circle 2 and Curved to match both to the resolution of the BFD at depth 15 cm, the sensitivity gain per pinhole for Circle 2 is 1.78 and that for Cone detector is 1.4 (FIG. 15(e)-(f)). But this increase in per pinhole sensitivity is more than offset by the decrease in the number of pinholes, resulting in a net loss of sensitivity for a Circle 2 system by 15% as compared to a curved detector system.

Higher Sensitivity Design Matching Resolution to Circle 3

A system designed for Circle 3 has a similar detrimental effect of sensitivity performance over a curved detector system because fewer pinholes can be accommodated, estimated to be about 26, which might not be an adequate number of projections for a artifact-free reconstruction. An additional problem for this case is the increase in surface area by a factor of 4 instead of by a factor of 2.6 for a curved-system at Circle 2. It is expected that there is a net decrement factor of sensitivity of 0.56 for Circle 3 over a curved detector system, or a loss of total sensitivity by 44%.

Using another comparison, if one designed the curved system and the flat Circle 3 system to have different hole diameters, such that each had resolution comparable to LEHR, the gain in per pinhole sensitivity for Circle 3 is more than offset by the decrease in the number of pinholes accommodated, for a net loss of sensitivity of about 12% as compared to a curved system.

Small Peripheral Imaging Application Design Examples

We now consider designs for small pinholes with large acceptance (opening) angle, which may lend to flexible orbit designs for many applications such as thyroid function imaging. We keep a large acceptance angle to look at a relatively small peripheral region of interest, 2 cm to 12 cm from the pinhole, with a potential thyroid imaging application in mind, or other applications where the organ of interest is near the surface of the body. We use a cone and a spherical detector example and compare to base-pinhole with flat detector (at Circle 1) and the two hypothetical flat-detectors at Circle 2 (same area as curved detector) and Circle 3 (tangential to curved surface), all with the same pinhole opening angle (see FIG. 9). The distance from the pinhole to the base-detector is chosen to be a=5 cm. The acceptance/opening angle of pinhole is chosen to be $\alpha$=77 deg. The base-plane pinhole hole diameter $d_o$ is set such that at 10 cm depth, the system resolution is that of Prism 3000XP using parallel LEHR, i.e., 0.8 cm (at depth 10 cm), as obtained by the Philips specification sheet.

Cone Detector

FIG. 16 is a diagram that compares designs for the cone detector with the Funk design. The first three plots (FIG. 16(a) through FIG. 16(c)) show the resolution, surface area and the extent-diameter respectively for the curved (marked '+'), and flat detectors at base-Circle 1 (marked 'o'), Circle 2 (marked with a 'diamond') and at Circle 3 (marked with a 'square'). The parameters are shown with respect to the height H of the cone detector, a design parameter. The base-plane flat detector at Circle 1 is designated as BFD. We see that even though the resolution is lower for the flat detector at Circle 2, or Circle 3 as expected, the extent-diameter and the surface area are increased substantially. As shown in FIG. 9, we would be able to use fewer pinholes compared to the BFD or the curved detector if we used flat detectors at Circle 2 and Circle 3. Therefore, for the subsequent plots we compare the curved and the BFD designs only. Note for the first 4 plots the pinhole hole diameter is kept same as that of the BFD.

Higher Resolution Design

In the fourth plot (FIG. 16(d)), we chose a cone of height H=a=5 cm and compared the resolution vs. depth, with that of the BFD. The BFD is kept at resolution of that of LEHR (0.8 cm) at 10 cm depth. We observed that the resolution improvement with the curved detector compared with BFD is always better and the improvement increases with depth. For the same sensitivity, the curved detector shows a resolution gain of 23% (mid-depth) and average gain of about 18% from 2 to 12 cm, with respect to the BFD-flat detector (which is kept at LEHR resolution at 10 cm depth).

Higher Sensitivity Design

FIG. 16(e) and FIG. 16(f). Now we increase the hole diameter of the pinhole of the curved detector such that the resolution matches the resolution of the BFD at 8 cm, which is near the middle of the depth of interest. Now the resolution of the curved detector pinhole is close to that of the BFD throughout the depth of interest. The sensitivity increased by a factor of 2.16 throughout the depth of interest—see FIG. 16(f). Even though the absolute sensitivity is lowered with depth for each, as expected, the improvement ratio remains the same. The resolution for the curved detector at depth 10 cm is slightly better than LEHR (or BFD), at 0.78 cm. However the surface area of the curved detector increased with respect to the base BFD by 1.6 times.

Spherical Detector

FIG. 17 shows results for the spherical detector as compared to the Funk design. The first three plots (FIG. 17(a)-FIG. 17(c)) show the resolution, surface area and the extent-diameter respectively for the curved (marked '+'), and flat detectors at base-Circle 1 (marked 'o'), Circle 2 (marked with a 'diamond') and at Circle 3 (marked with a 'square'). The parameters are shown with respect to the height H of the center of curvature of the spherical detector. Positive H indicates above the base-plane and negative H indicates lower than the base-plane. The base-plane flat detector at Circle 1 is designated as BFD. We see that even though the resolution is lower for the flat detector at Circle 2, or Circle 3 as expected, the extent-diameter and the surface area are increased substantially. As shown in FIG. 9, we would be able to use fewer of the pinholes compared to the BFD or the curved detector if we used flat detectors at Circle 2 and Circle 3. Therefore, for the subsequent plots we compare the curved and the BFD designs only. Note for the first 4 plots the pinhole hole diameter is kept same as that of the BFD.

Higher Resolution Design

In the fourth plot (FIG. 17(d)), we chose the center to be at the base-plane, H=0 and compared the resolution vs. depth, with that of the BFD. The hole diameter of the BFD (and curved) is such that the BFD is at resolution of that of LEHR (0.8 cm) at 10 cm depth. We observed that the resolution improvement with the curved detector compared with BFD is always better and the improvement increases with depth. For the same sensitivity, the curved detector shows a resolution gain of 28% (mid-depth) and average gain of about 22% from 2 to 12 cm, with respect to the BFD-flat detector (which is kept at LEHR resolution at 10 cm depth).

Higher Sensitivity Design

FIG. 17(e)-(f). Now we increase the hole diameter of the pinhole of the curved detector such that the resolution matches the resolution of the BFD at 8 cm, which is near the middle of the depth of interest, see FIG. 17(e). Now the resolution of the curved detector pinhole is close to that of the BFD throughout the depth of interest. The sensitivity increased by a factor of 2.40 throughout the depth of interest—see FIG. 17(f). Even though the absolute sensitivity is lowered with depth for each, as expected, the improvement ratio remains the same. The resolution for the curved detector at depth 10 cm is slightly better than LEHR (or BFD), at 0.77 cm. However the surface area of the curved detector increased with respect to the base BFD by 2 times.

We repeated the simulations with H=−1 cm and got a sensitivity gain of 2.13 times compared to BFD, with 1.61 times increase in surface area. One clear advantage of lowering the center-of-spherical surface is lower-parallax errors. Note however, the surface area increase is comparable to the cone-detector case, but the sensitivity gain is slightly lesser for the sphere (2.13) vs. 2.16 for the cone detector.

Given the average resolution, we simulated the resolution and sensitivity improvement for example cases of a conical and spherical curved detectors for an orbit designed for cardiac application. For a conical design, (FIG. 18) with common a, b, and α parameters with Funk et al design, the sensitivity improvement per pinhole was 40% from Funk et al.

Optimization of the Curved Surface of a Detector

We now formulate a calculation to determine a surface for which the resolution-squared is minimized given that the surface area is either held constant or is minimized. A geometric constraint is that the base-extent of the surface is fixed. For the surface, maximum sensitivity can be achieved on resolution-sensitivity trade-off given a constant surface area $A_0$. A functional minimizing the resolution can then be formulated as $$R_{av} = \int_S Res^2(\theta) dA \bigg/ \int_S dA + \lambda \left( \int_S dA - A_0 \right)$$

where dA is the differential surface-area element, θ is the angle of the ray with the horizontal (as defined in preliminary work section), $A_0$ is a constant detector surface area we want to achieve for each pinhole, λ is a Lagrange multiplier. If z(θ) is a height-function of the surface to be found in a co-ordinate system based on the pinhole center, both the surface-element dA and the resolution-squared can be formulated as a function of z(θ). Thus, $$R_{av} = \int_S Res^2(z(\theta), \theta) f(z(\theta), \theta) d\theta \bigg/ \int_S f(z(\theta), \theta) d\theta + \lambda \left( \int_S f(z(\theta), \theta) d\theta - A_0 \right),$$

where f(z(θ), θ) relates the differential angle to the differential surface area, to be determined by the geometry. From circular symmetry the surface integral reduces to a function of ray angle θ. Finding the height-function z(θ) that minimizes the functional $R_{av}$ is a well-defined variational problem and can be solved by deriving the Euler-Lagrange equations for this functional.

In an alternate formulation we may wish to minimize the resolution functional with a weighted surface area term, given by $$R_{av} = \int_S Res^2(z(\theta), \theta) f(z(\theta), \theta) d\theta \bigg/ \int_S f(z(\theta), \theta) d\theta + w_0 \left( \int_S f(z(\theta), \theta) d\theta \right),$$

where $w_0$ balances the benefit-vs.-cost of improved resolution (or sensitivity) with increased surface area.

The constant area $A_0$ can be chosen as a factor with respect to the crystal surface area needed for a standard clinical system or with respect to a flat detector system. A few different cases—conservative and moderate values will be tried. The weight $w_0$ similarly will be chosen heuristically within a range.

Since there could be potential manufacturing design constraints, we also consider other specific surfaces such as a truncated Gaussian and a Co-sinusoid, in addition to the paraboloid, the cone and the sphere already considered.

We have shown that the curved detector will increase the resolution of the pinhole-gamma-camera compared to a flat detector at its base, which increase in resolution can then be traded with sensitivity by increasing the pin-hole diameter. However we have to ensure we do not increase the noise in our acquired counts. We have increased signal counts into these pinholes but increased surface area which detects these counts, which may or may not increase the noise, depending on our design. One possible way to keep similar noise-levels is to maintain the same number of detector pixels as the flat detector. We may or may not have a small (perhaps negligible) drop of resolution depending on the surface type because of this.

Ray-Tracing Simulation

We implemented a ray-tracing based forward projector of the pinhole geometry for a flat detector and a paraboloid detector with promising results. A point source emits gamma rays in all directions. Due to non-zero diameter of the pinhole and penetration through the septa therefore, the emitted rays are detected by more than one point in the detector. We modeled the pinhole resolution using methods described in the paper of M. Gieles, H. W A de Jong and F. J. Beekman, "Monte Carlo simulations of pinhole imaging accelerated by kernel-based forced detection", *Phys. Med. Biol*, vol. 47, pp 1853-1867, 2002, hereinafter "Gieles." We simulated a single ray from the point source to the mid-point of the pin-hole diameter and around the point where it is detected "smearing" onto the detector an effective point-spread-function (PSF). This PSF approximately accounts for the effects of other rays which are emanating from this source and going through the finite width pin-hole or penetrating the lead-septa. This point-spread-function (PSF) in the notation of Gieles is given as $$PSF(S,D,E) = I_0 G(S,D) A(S,D,E)$$

where $I_0$ is proportional to the activity of the point source, G(S, D) is a geometric fall-off factor modeling photon flux intensity as a function of the distance from the source and detector orientation, and A(S, D, E) is an energy-dependent factor modeling attenuation through the pin-hole septa material, if any. The geometric factor is given by $$G(S, D) = \frac{\cos\varphi}{4\pi|S-D|^2} = \frac{(S-D)\cdot\hat{n}}{4\pi|S-D|^3}.$$

To compute the attenuation factor, A(S, D, E), the incident photons were divided into categories whether they passed through the pin-hole, un-hindered by the collimator septa or were attenuated by different parts of the collimator. For this model, the result was found to agree with Monte Carlo simulations with Forced Detection by Gieles.

Figures 24A, 24B:
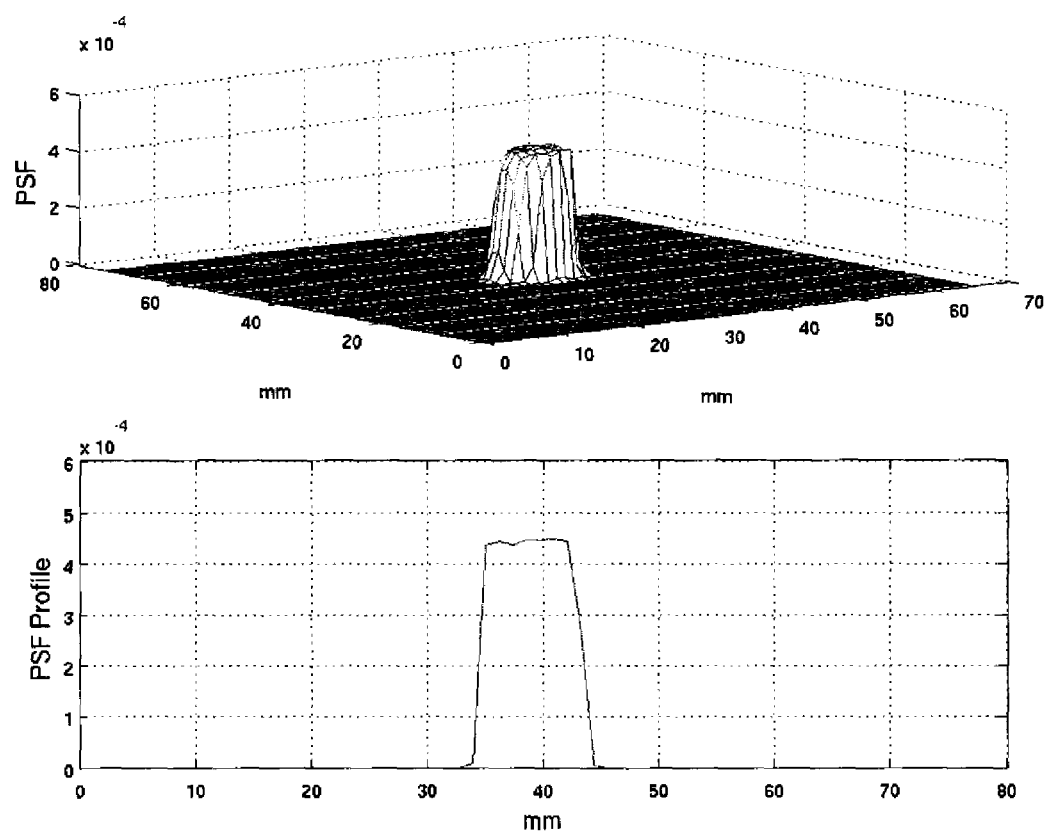
FIG. 24A is diagram illustrating a three-dimensional visualization of a Point Spread Function (PSF).
FIG. 24B is diagram illustrating a two-dimensional section through the Point Spread Function (PSF) of FIG. 24A.

For this study, we modeled the G(S, D) factor but only approximately took into account the septal penetration by taking effective pinhole diameter as $$d = \sqrt{d_0[d_0 + 2\mu^{-1}\tan\alpha/2]}$$

where $d_0$ is the actual physical hole-diameter and $\mu=21.66$ cm$^{-1}$ is the linear attenuation coefficient of lead at 150 keV considering the septa-penetration approximately. Beyond this diameter the attenuation is considered to be perfectly 1. We did not incorporate the detector blur as yet. Thus ideally our results should yield a FWHM resolution of $$\left(1 + \frac{b}{a}\right)d$$

for a flat detector. For a curved detector the resolution varies across the face (because of the varying magnification) and the expressions for a paraboloid are derived in our cited paper. Here we test the resolution for a flat detector at a=12 cm, b=15 cm for an effective pinhole diameter of 4.11 mm. We project forward and back to a plane at a given depth. Note that at this diameter the system resolution (after we include the detector resolution) is that of LEHR at 10 cm. We also tested bigger pinholes of 12 mm diameter and a different magnification, a=80 mm, b=150 mm. The results are tabulated and the point spread function for pinhole size 4.11 mm after back-projected to depth b=150 mm is shown in FIG. 24A and FIG. 24B. Note even though we modeled the geometric factor, for our distances, for the small pin hole the geometric factor is nearly constant, making the point spread function just a circular aperture function.

For the curved detector we imaged a point source that moves across the face of the detector on a plane at depth 150 mm for pinhole diameter 4.11 mm and then at an increased pinhole diameter of 5.0 yielding sensitivity of 1.48. We kept the distance from the pinhole to the base-plane of the curved detector as a=120 mm. The collimator FWHM at the two settings are given in Table 2. Comparison of the collimator FWHM indicates that the average collimator resolution at depth 150 mm for the curved for pinhole opening of 5 mm is 10.52 mm while that of the flat detector is 9.34 mm. Overall the results match well with theoretical values. For example, the 5 mm diameter at the edge the collimator resolution is 11.7 mm while the ideal expected is 11.3 mm.

We have demonstrated that appropriately curved detectors on pinholes with same compactness can provide improved resolution and/or sensitivity performance over conventional SPECT systems. Our initial high performance gamma-camera system design results show promise. Our paraboloid detector with pinhole apertures obtained 7.4 to 9.3 times the sensitivity of a standard clinical system, for similar resolution, while a conical system would achieve an estimated 7 to 9 times the standard clinical. The parameters for the pinhole were kept similar to what was used in the commercial Funk design. We have demonstrated that a paraboloid or conical surface with these parameters yields better overall sensitivity than using flat detectors at higher focal distance. As for the latter, a smaller number of pinholes can be accommodated in any given sector in FIG. 1.

We assumed a scintillator detector of resolution 0.32 cm for our design. However the geometrical improvement is independent of detector material. Note that other applications requiring high-resolution (such as small animal imaging) would also benefit from the higher magnification factor obtained by using the curved detector, by improving resolution over a pinhole system with flat detectors. Curved detectors can also be used with other collimators, such as converging and diverging collimators for resolution or sensitivity improvement. The differences in performance between the paraboloid, conical, spherical, and flat surfaces indicate an optimum surface giving a better performance is expected to exist. Ray-tracing simulations were done to validate the theoretical results.

One of the disadvantages of a curved detector system over a flat detector system is the potential increase in manufacturing costs. However the pinhole designs do not have moving parts, reducing long-term service costs, and mitigating some of the detector cost issues compared to other systems with moving parts.

Definitions

Recording the results from an imaging operation or image acquisition, such as for example, recording results at a particular wavelength, is understood to mean and is defined herein as writing output data to a storage element, to a machine-readable storage medium, or to a storage device. Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example an imaging or image processing algorithm coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A Single Proton Emission Computer Tomography (SPECT) camera, comprising:
   a first plurality of pinhole apertures, said first plurality of pinhole apertures disposed relative to each other in a configuration calculated to receive input electromagnetic radiation emitted from a structure of interest, each of said first plurality of pinhole apertures having a respective hole diameter;
   a second plurality of detectors, each of said second plurality of detectors configured to present a non-planar detector surface, said non-planar surface described by a solution for a height function $z(\theta)$ obtained by minimizing $R_{av}$, where $R_{av}$ is given by $$R_{av} = \int_s Res^2(z(\theta), \theta) f(z(\theta), \theta) d\theta \bigg/ \int_s f(z(\theta), \theta) d\theta + \lambda \bigg( \int_s f(z(\theta), \theta) d\theta - A_0 \bigg);$$

at least one of each of said second plurality of detectors coupled to a respective one of said first plurality of pinhole apertures at a defined location relative to said respective one of said first plurality of pinhole apertures, at least one of each of said second plurality of detectors configured to detect input electromagnetic radiation passing through a selected one of said first plurality of pinhole apertures to which said second plurality of detectors is coupled; and
   a third plurality of output terminals, at least one of said third plurality of output terminals configured to provide a signal representative of electromagnetic radiation detected by a respective one of said second plurality of detectors.

2. The SPECT camera of claim 1, wherein said electromagnetic radiation is gamma radiation.

3. The SPECT camera of claim 1, wherein each of said second plurality of detectors configured to present a non-planar detector surface presents a paraboloid surface.

4. The SPECT camera of claim 1, wherein each of said second plurality of detectors configured to present a non-planar detector surface presents a conical surface.

5. The SPECT camera of claim 1, wherein said respective hole diameter of each of said first plurality of pinhole apertures is configured and said non-planar detector surface of each of said second plurality of detectors is configured to provide a predefined sensitivity and a predefined resolution of said camera.

6. The SPECT camera of claim 1, wherein a number defining said first plurality of pinhole apertures is controlled to provide a predefined sensitivity and a predefined resolution of said camera.

7. The SPECT camera of claim 1, wherein said defined location of said at least one of each of said second plurality of detectors relative to said respective one of said first plurality of pinhole apertures is configured to provide a predefined sensitivity and a predefined resolution of said camera.

8. The SPECT camera of claim 1, combined with:
   a signal conditioning component; and
   a signal analyzer.

9. The SPECT camera of claim 8, wherein said signal analyzer is configured to provide an image of said structure of interest to a user.

10. The SPECT camera of claim 8, wherein said signal analyzer is configured to record an image of said structure of interest.

11. The SPECT camera of claim 1, wherein each of said second plurality of detectors configured to present a non-planar detector surface presents a spherical surface.

* * * * *